(12) United States Patent
Terao et al.

(10) Patent No.: US 7,221,634 B2
(45) Date of Patent: May 22, 2007

(54) APPARATUS FOR AND METHOD OF RECORDING DATA, AND PROGRAM

(75) Inventors: Motohiro Terao, Kanagawa (JP);
Hideki Ando, Kanagawa (JP); Satoshi Katsuo, Kanagawa (JP); Takashi Furukawa, Kanagawa (JP); Hisao Tanaka, Tokyo (JP); Masaki Hirose, Kanagawa (JP); Takayoshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 10/694,380

(22) Filed: Oct. 27, 2003

(65) Prior Publication Data

US 2004/0085864 A1    May 6, 2004

(30) Foreign Application Priority Data

Oct. 29, 2002  (JP)  ............................. P2002-313781

(51) Int. Cl.
*G11B 11/00* (2006.01)

(52) U.S. Cl. ............................... 369/53.24; 369/53.31; 369/47.32

(58) Field of Classification Search .................. 369/83, 369/84, 53.24, 47.13, 30.05, 13.56, 93, 96, 369/53.21, 47.15, 30.07, 47.12, 59.25, 53.22
See application file for complete search history.

(56) References Cited

U.S. PATENT DOCUMENTS 6,256,453 B1    7/2001  Takano ........................ 369/126
2004/0013059 A1*  1/2004  Sasaki et al. ............. 369/47.12

FOREIGN PATENT DOCUMENTS

| JP | 63-249974 | 10/1988 |
| JP | 05-151712 | 6/1993 |

* cited by examiner

*Primary Examiner*—Thang V. Tran
*Assistant Examiner*—LaTanya Bibbins
(74) *Attorney, Agent, or Firm*—Frommer Lawrence & Haug LLP; William S. Frommer; Thomas F. Presson

(57) ABSTRACT

The rewriting counts in respective areas of a rewritable medium are uniformized. If empty areas are present on the rewritable medium rearward of a recording start position in terms of addresses, then data is recorded in those empty areas. When no empty areas become available rearward of the recording start position, data is then recorded in empty areas forward of the recording start position. The numbers of times that data is recorded in recording areas of the recording medium are thus averaged.

17 Claims, 42 Drawing Sheets

| EMPTY AREA | AREA LEADING POSITION | SIZE |
|---|---|---|
| A | 01000 | 7000 |
| B | 10000 | 9000 |
| C | 20000 | 6000 |
| D | 30000 | 9000 |
|  |  |  |

102

| EMPTY AREA | AREA LEADING POSITION | SIZE |
|---|---|---|
|  |  |  |
|  |  |  |
|  |  |  |
|  |  |  |
|  |  |  |

103

| RECORDING COUNT | 1 |
|---|---|

104

| RECORDING START POSITION | 00000 |
|---|---|

| EMPTY AREA | AREA LEADING POSITION | SIZE |
|---|---|---|
| A' | 05000 | 3000 |
| B | 10000 | 9000 |
| C | 20000 | 6000 |
| D | 30000 | 9000 |
|  |  |  |

102

| EMPTY AREA | AREA LEADING POSITION | SIZE |
|---|---|---|
|  |  |  |
|  |  |  |
|  |  |  |
|  |  |  |
|  |  |  |

103

| RECORDING COUNT | 1 |
|---|---|

104

| RECORDING START POSITION | 05000 |
|---|---|

| EMPTY AREA | AREA LEADING POSITION | SIZE |
|---|---|---|
| B | 10000 | 9000 |
| C | 20000 | 6000 |
| D | 30000 | 9000 |
|  |  |  |
|  |  |  |

102

| EMPTY AREA | AREA LEADING POSITION | SIZE |
|---|---|---|
|  |  |  |
|  |  |  |
|  |  |  |
|  |  |  |
|  |  |  |

103

| RECORDING COUNT | 1 |
|---|---|

104

| RECORDING START POSITION | 05000 |
|---|---|

| EMPTY AREA | AREA LEADING POSITION | SIZE |
|---|---|---|
| B' | 14000 | 5000 |
| C | 20000 | 6000 |
| D | 30000 | 9000 |
| | | |
| | | |

102

| EMPTY AREA | AREA LEADING POSITION | SIZE |
|---|---|---|
| | | |
| | | |
| | | |
| | | |
| | | |

103

| RECORDING COUNT | 1 |
|---|---|

104

| RECORDING START POSITION | 14000 |
|---|---|

| EMPTY AREA | AREA LEADING POSITION | SIZE |
|---|---|---|
| B' | 14000 | 5000 |
| F | 20000 | 8000 |
| D | 30000 | 9000 |
| | | |
| | | |

102

| EMPTY AREA | AREA LEADING POSITION | SIZE |
|---|---|---|
| | | |
| | | |
| | | |
| | | |
| | | |
| | | |

103

| RECORDING COUNT | 1 |
|---|---|

104

| RECORDING START POSITION | 14000 |
|---|---|

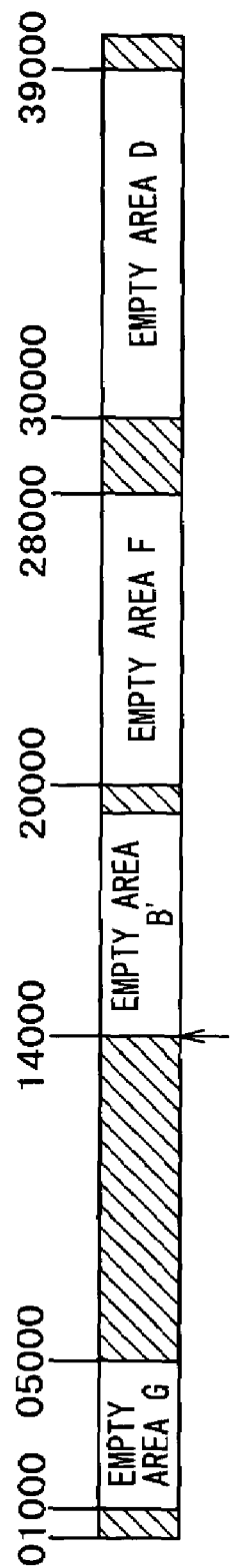

F I G. 1 9

101

| EMPTY AREA | AREA LEADING POSITION | SIZE |
|---|---|---|
| B' | 14000 | 5000 |
| F | 20000 | 8000 |
| D | 30000 | 9000 |
| | | |
| | | |

102

| EMPTY AREA | AREA LEADING POSITION | SIZE |
|---|---|---|
| G | 01000 | 4000 |
| | | |
| | | |
| | | |
| | | |
| | | |

| RECORDING COUNT | 1 |
|---|---|

103

| RECORDING START POSITION | 14000 |
|---|---|

104

12

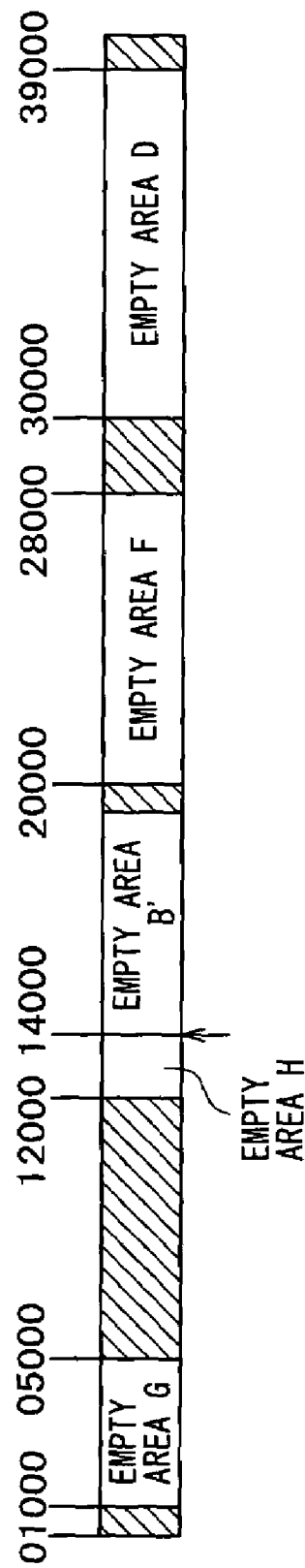

| EMPTY AREA | AREA LEADING POSITION | SIZE |
|---|---|---|
| B' | 14000 | 5000 |
| F | 20000 | 8000 |
| D | 30000 | 9000 |
| | | |
| | | |

102

| EMPTY AREA | AREA LEADING POSITION | SIZE |
|---|---|---|
| G | 01000 | 4000 |
| H | 12000 | 2000 |
| | | |
| | | |
| | | |

103

| RECORDING COUNT | 1 |
|---|---|

104

| RECORDING START POSITION | 14000 |
|---|---|

| EMPTY AREA | AREA LEADING POSITION | SIZE |
|---|---|---|
|  |  |  |
|  |  |  |
|  |  |  |
|  |  |  |
|  |  |  |

102

| EMPTY AREA | AREA LEADING POSITION | SIZE |
|---|---|---|
| G | 01000 | 4000 |
| H | 12000 | 2000 |
|  |  |  |
|  |  |  |
|  |  |  |

103

| RECORDING COUNT | 1 |
|---|---|

104

| RECORDING START POSITION | 39000 |
|---|---|

FIG. 24

| EMPTY AREA | AREA LEADING POSITION | SIZE |
|---|---|---|
|  |  |  |
|  |  |  |
|  |  |  |
|  |  |  |
|  |  |  |

101

| EMPTY AREA | AREA LEADING POSITION | SIZE |
|---|---|---|
| G | 01000 | 4000 |
| H | 12000 | 2000 |
|  |  |  |
|  |  |  |
|  |  |  |

102

| RECORDING COUNT | 2 |
|---|---|

103

| RECORDING START POSITION | 00000 |
|---|---|

| EMPTY AREA | AREA LEADING POSITION | SIZE |
|---|---|---|
| G | 01000 | 4000 |
| H | 12000 | 2000 |
|  |  |  |
|  |  |  |
|  |  |  |

102

| EMPTY AREA | AREA LEADING POSITION | SIZE |
|---|---|---|
|  |  |  |
|  |  |  |
|  |  |  |
|  |  |  |
|  |  |  |

103

| RECORDING COUNT | 2 |
|---|---|

104

| RECORDING START POSITION | 00000 |
|---|---|

FIG. 27

| EMPTY AREA | AREA LEADING POSITION | SIZE |
|---|---|---|
|  |  |  |
|  |  |  |
|  |  |  |
|  |  |  |
|  |  |  |

101

| EMPTY AREA | AREA LEADING POSITION | SIZE |
|---|---|---|
|  |  |  |
|  |  |  |
|  |  |  |
|  |  |  |
|  |  |  |

102

| RECORDING COUNT | 2 |
|---|---|

103

| RECORDING START POSITION | 14000 |
|---|---|

| EMPTY AREA | AREA LEADING POSITION | SIZE |
|---|---|---|
|  |  |  |
|  |  |  |
|  |  |  |
|  |  |  |
|  |  |  |

102

| EMPTY AREA | AREA LEADING POSITION | SIZE |
|---|---|---|
|  |  |  |
|  |  |  |
|  |  |  |
|  |  |  |
|  |  |  |

103

| RECORDING COUNT | 3 |
|---|---|

104

| RECORDING START POSITION | 00000 |
|---|---|

| EMPTY AREA | AREA LEADING POSITION | SIZE |
|---|---|---|
| B | 10000 | 9000 |
| D | 30000 | 9000 |
| A | 01000 | 7000 |
| C | 20000 | 6000 |
|  |  |  |

102

| EMPTY AREA | AREA LEADING POSITION | SIZE |
|---|---|---|
|  |  |  |
|  |  |  |
|  |  |  |
|  |  |  |
|  |  |  |
|  |  |  |

103

| RECORDING COUNT | 1 |
|---|---|

| EMPTY AREA | AREA LEADING POSITION | SIZE |
|---|---|---|
| D | 30000 | 9000 |
| A | 01000 | 7000 |
| C | 20000 | 6000 |
| B'' | 14000 | 5000 |
|  |  |  |

102

| EMPTY AREA | AREA LEADING POSITION | SIZE |
|---|---|---|
|  |  |  |
|  |  |  |
|  |  |  |
|  |  |  |
|  |  |  |

103

| RECORDING COUNT | 1 |
|---|---|

| EMPTY AREA | AREA LEADING POSITION | SIZE |
|---|---|---|
| A | 01000 | 7000 |
| C | 20000 | 6000 |
| B'' | 14000 | 5000 |
| | | |
| | | |

102

| EMPTY AREA | AREA LEADING POSITION | SIZE |
|---|---|---|
| | | |
| | | |
| | | |
| | | |
| | | |

103

| RECORDING COUNT | 1 |
|---|---|

| EMPTY AREA | AREA LEADING POSITION | SIZE |
|---|---|---|
| A | 01000 | 7000 |
| C | 20000 | 6000 |
| B'' | 14000 | 5000 |
| | | |
| | | |

102

| EMPTY AREA | AREA LEADING POSITION | SIZE |
|---|---|---|
| E | 30000 | 9000 |
| | | |
| | | |
| | | |
| | | |

103

| RECORDING COUNT | 1 |
|---|---|

APPARATUS FOR AND METHOD OF RECORDING DATA, AND PROGRAM

BACKGROUND OF THE INVENTION

The present invention relates to a recording apparatus for uniformizing the numbers of times that data are rewritten in respective recording areas of a rewritable recording medium.

DESCRIPTION OF THE RELATED ART

Randomly accessible recording mediums such as optical disks, for example, are finding growing use in many fields including broadcasting applications as the recording density of those recording mediums becomes higher and higher.

The number of times that data can be rewritten on optical disks is about 1000 at maximum. Therefore, if data are repeatedly rewritten in a certain local area on an optical disk, then the number of times that data have been recorded in that local area soon reaches its upper limit, preventing subsequent data from being recorded in that local area. The failure to record data in the local area on the optical disk means that it is difficult to have a large continuous recording area available on the optical disk, resulting in limitations on the recording and reproducing process, such as an increased seeking time, for example.

Conventional recording apparatus using optical disks or the like as recording mediums are arranged to update information (hereinafter referred to as "empty area data") as to the locations and sizes of empty areas on the recording medium which is used, depending on the recording or deletion of data, and to record the updated information back on the recording medium. However, the conventional recording apparatus are not arranged to uniformize the numbers of times that data can be recorded in respective recording areas of the recording medium, based on the empty area data.

SUMMARY OF THE INVENTION

It is therefore an object of the present invention to provide a recording apparatus, a recording method, and a program which are capable of uniformizing the numbers of times that data can be recorded in respective recording areas of a randomly accessible recording medium.

According to the present invention, there is provided a recording apparatus including determining means for determining a sequence to record input data in empty areas among recording areas of the recording medium for substantially uniformizing recording counts in respective recording areas, and recording means for recording the input data in the empty areas according to the sequence determined by the determining means.

According to the present invention, there is also provided a recording method including the steps of determining a sequence to record input data in empty areas among recording areas of the recording medium for substantially uniformizing recording counts in respective recording areas, and recording the input data in the empty areas according to the sequence determined by the determining step.

According to the present invention, there is further provided a program for enabling a computer to carry out a recording method, the method including the steps of controlling determination of a sequence to record input data in empty areas among recording areas of a recording medium for substantially uniformizing recording counts in respective recording areas, and controlling recording of the input data in the empty areas according to the sequence determined by the determination controlling step.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a diagram showing other contents stored in the memory shown in FIG. 1;

FIG. 10 is a diagram showing other contents stored in the memory shown in FIG. 1;

FIG. 11 is a diagram showing other contents stored in the memory shown in FIG. 1;

FIG. 13 is a diagram showing other contents stored in the memory shown in FIG. 1;

FIG. 17 is a diagram showing other contents stored in the memory shown in FIG. 1;

FIG. 18 is a diagram showing another recorded state of data on the optical disk shown in FIG. 1;

FIG. 19 is a diagram showing other contents stored in the memory shown in FIG. 1;

FIG. 20 is a diagram showing another recorded state of data on the optical disk shown in FIG. 1;

FIG. 21 is a diagram showing other contents stored in the memory shown in FIG. 1;

FIG. 23 is a diagram showing other contents stored in the memory shown in FIG. 1;

FIG. 24 is a diagram showing other contents stored in the memory shown in FIG. 1;

FIG. 26 is a diagram showing other contents stored in the memory shown in FIG. 1;

FIG. 27 is a diagram showing other contents stored in the memory shown in FIG. 1;

FIG. 29 is a diagram showing other contents stored in the memory shown in FIG. 1;

FIG. 33 is a diagram showing other contents stored in the memory shown in FIG. 1;

FIG. 37 is a diagram showing other contents stored in the memory shown in FIG. 1;

FIG. 39 is a diagram showing other contents stored in the memory shown in FIG. 1;

FIG. 41 is a diagram showing other contents stored in the memory shown in FIG. 1.

DETAILED DESCRIPTION OF THE PREFERRED EMBODIMENTS

Figure 1:
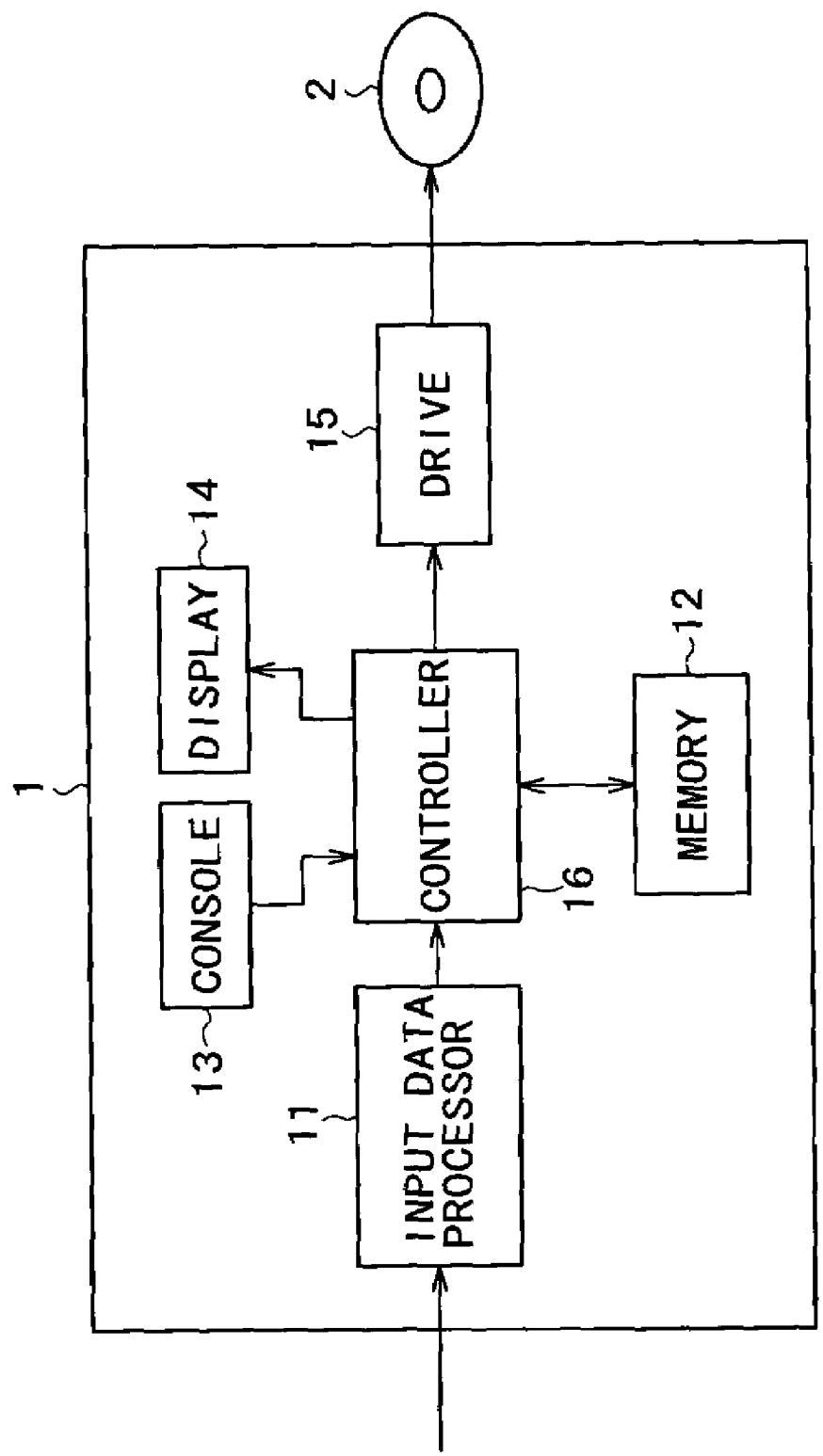
FIG. 1 is a block diagram of a recording apparatus according to the present invention.

FIG. 1 shows in block form a recording apparatus 1 according to the present invention.

As shown in FIG. 1, the recording apparatus 1 performs an editing process for recording data on an optical disk 2 and deleting data recorded on the optical disk 2.

The recording apparatus 1 comprises an input data processor 11, a memory 12, a console 13, a display 14, a drive 15, and a controller 16.

The input data processor 11 comprises a video/audio interface, an encoder, and a buffer memory. The input data processor 11 encodes and processes an image signal inputted from an imaging device (not shown) and an audio signal inputted from a microphone (not shown), and supplies the encoded and processed data through the controller 16 to the drive 15.

The memory 12 stores data required in the editing process that is performed by the controller 16, and supplies the stored data to the controller 16.

The console 13 is operated by the user for entering various commands into the controller 16. The display 14 displays messages and images in response to data supplied from the controller 16.

The drive 15 records input data supplied from the input data processor 11 through the controller 16 on the optical disk 2, and deletes data recorded on the optical disk 2.

The controller 16 controls the components of the recording apparatus 1.

The editing process performed by the recording apparatus 1 will be described below with reference to FIG. 2. For the sake of brevity, various processes of the editing process will be described below according to the sequence represented by the flowchart shown in FIG. 2. However, a startup process in step S1, a data recording process in step S3, and a data deleting process in step S5 may be carried out independently of each other, or may be carried out by other apparatus.

In step S1, the controller 16 activates the recording apparatus 1 when its power supply is turned on, for example. The startup process in step S1 will be described in detail later on with reference to FIG. 3.

In step S2, the controller 16 determines whether a request for data recording is inputted from the console 13 or not. If a request for data recording is inputted, then control goes to step S3 in which the controller 16 controls the drive 15 to record data inputted from the input data processor 11 on the optical disk 2. The data recording process in step S3 will be described in detail later on with reference to FIG. 7.

If a request for data recording is not inputted in step S2, or after data has been recorded in step S3, control goes to step S4 in which the controller 16 determines whether a request for data deletion is inputted from the console 13 or not. If a request for data deletion is inputted, then control goes to step S5 in which the controller 16 deletes data. The data deleting process in step S5 will be described in detail later on with reference to FIG. 8.

If a request for data deletion is not inputted in step S4, or after data has been deleted in step S5, control goes to step S6 in which the controller 16 determines whether a command for ending the editing process is inputted from the console 13 or not. If a command for ending the editing process is inputted, then control goes to step S7. For example, if the optical disk 2 is removed, then the controller 16 judges that a command for ending the editing process is inputted, and control goes to step S7.

In step S7, the controller 16 controls the drive 15 to record empty area rewriting management data generated in steps S1, S3, S5, as well as empty area data, i.e., information as to the locations and sizes of empty areas on the optical disk 2, on the optical disk 2.

The processing in step S7 may be effected when the optical disk 2 is removed or the power supply is turned off.

Thereafter, the editing process is put to an end.

The startup process in step S1 shown in FIG. 2 will be described below with reference to FIG. 3.

In step S11, the controller 16 generates a current queue 101, a next queue 102, a recording count column 103, and a recording start position column 104 in the memory 12. When the current queue 101, the next queue 102, the recording count column 103, and the recording start position column 104 are generated, they are empty.

In step S12, the controller 16 determines whether empty area rewriting management data is recorded on the optical disk 2 or not. If it is judged empty area rewriting management data is not recorded on the optical disk 2, then control goes to step S13. Since empty area rewriting management data is not recorded on an optical disk 2 if no data has been recorded on or deleted from the optical disk 2, i.e., no editing process has been performed on the optical disk 2, by the recording apparatus 1, i.e., if no empty area rewriting management data is not recorded on the optical disk 2 in step S7 shown in FIG. 2, when such an optical disk 2 is inserted, control goes to step S13.

In step S13, the controller 16 determines whether empty area data is recorded on the optical disk 2 or not. If it is judged that no empty area data is recorded on the optical disk 2, then control goes to step S14. Since no empty area data is recorded on an optical disk 2 if the optical disk 2 is blank as it is shipped and no data has been recorded on or deleted from the optical disk 2 by the recording apparatus 1 or a conventional recording apparatus, when such an optical disk 2 is inserted, control goes to step S14.

In step S14, the controller 16 sets area information of all empty areas that are present on the optical disk 2 when it is inserted (the area information may represent the start positions and sizes of the empty areas) in the current queue 101 generated in the memory 12 according to the sequence of the positions in terms of the addresses of the empty areas.

Figure 5:
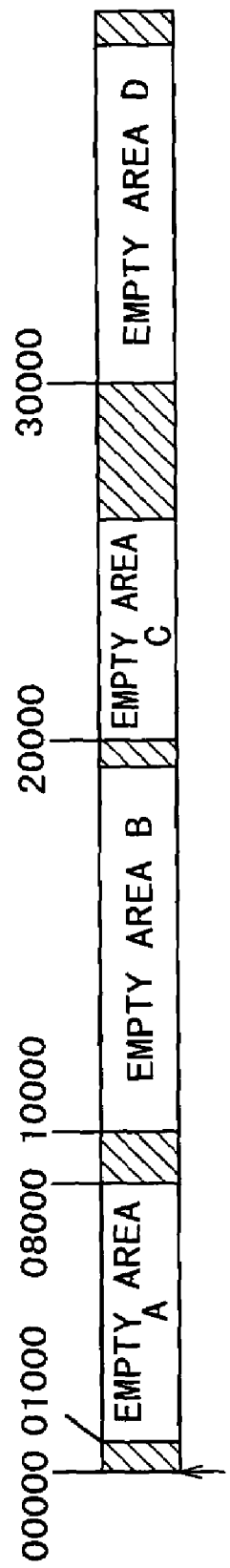
FIG. 5 is a diagram showing a recorded state of data on an optical disk shown in FIG. 1.

For example, as shown in FIG. 5, if empty areas A, B, C, D are present on the optical disk 2, then the start positions and sizes of those empty areas A, B, C, D are set in the current queue 101 in the sequence of the start positions, as shown in FIG. 6. The positions of the empty areas are represented by logic block numbers which indicate logic sector numbers of respective blocks, and the sizes of the empty areas are represented by block numbers belonging to the empty areas.

Setting area information will hereinafter also be referred to as registering empty areas.

In step S15, the controller 16 initializes the recording count column 103 generated in the memory 12 to 1, as shown in FIG. 6. In step S16, the controller 16 initializes the recording start position column 104 to the leading position (position 00000) on the optical disk 2. In FIG. 5 and other similar figures, the upward arrow indicates the recording start position.

If it is judged that empty area data is recorded in step S13, then control goes to step S17 in which the controller 16 registers area information of empty areas represented by the empty area data in the current queue 101 in the memory 12 according to the sequence of the positions in terms of the addresses of the empty areas. Thereafter, control proceeds to step S15.

If it is judged that empty area rewriting management data is recorded in step S12, then control goes to step S18. The empty area rewriting management data refers to all data set respectively in the current queue 101, the next queue 102, the recording count column 103, and the recording start position column 104 as shown in FIG. 6, and is recorded on the optical disk 2 which has been edited, in step S7.

In step S18, the controller 16 registers empty areas registered in the current queue 101 which are contained in the empty area rewriting management data, in the current queue 101 generated in the memory 12, and also registers empty areas registered in the next queue 101 which are contained in the empty area rewriting management data, in the next queue 102 generated in the memory 12. In step S19, the controller 16 sets the writing count column 103 generated in the memory 12 to the value set in the writing count column 103 which is contained in the empty area rewriting management data. In step S20, the controller 16 sets the recording start position column 104 generated in the memory 12 to the position set in the recording start position column 104 which is contained in the empty area rewriting management data.

According to the processing in steps S18 through S20, the empty area rewriting management data on the optical disk 2 is read into the memory 12.

Figure 2:
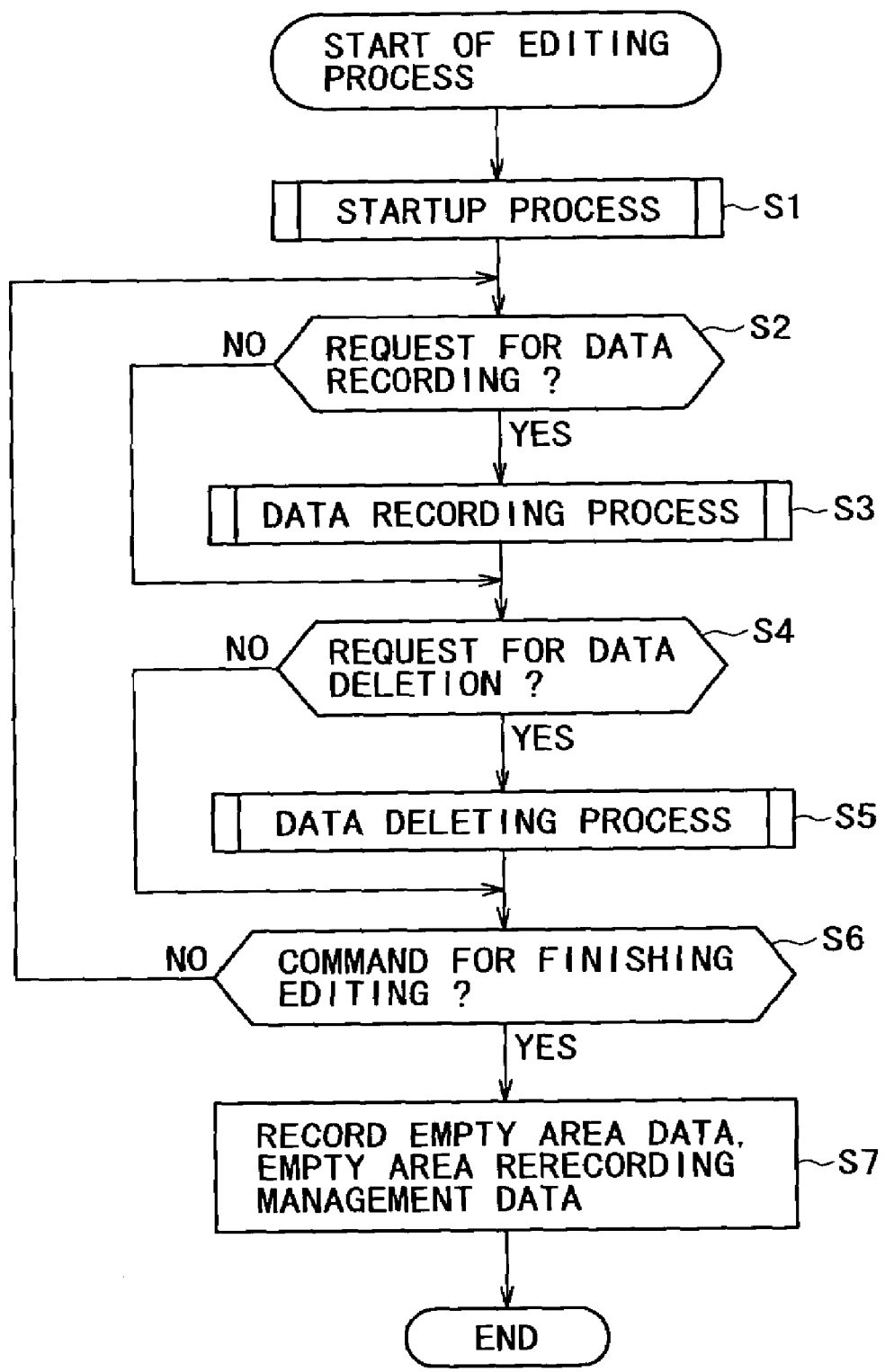
FIG. 2 is a flowchart of an editing process performed by the recording apparatus shown in FIG. 1.

After the recording start position column 104 is set to the given position in step S16 or S20, then control returns to step S2 shown in FIG. 2.

The data recording process in step S3 will be described in detail below with reference to FIG. 7, and the data deleting process in step S5 will be described in detail below with reference to FIG. 8. First, these processes will briefly be described with reference to the flowcharts of FIGS. 7 and 8, and will thereafter be described in detail by way of specific example.

First, the data recording process in step S3 will be described below with reference to the flowchart of FIG. 7. In step S31 shown in FIG. 7, the controller 16 determines whether empty areas are recorded in the current queue 101 generated in the memory 12 or not in step S14, S17, or S18 shown in FIG. 3. If it is judged that empty areas are recorded in the current queue 101, then control goes to step S32 in which the controller 16 determines the empty area positioned most forwardly in terms of addresses, i.e., the empty area closest to the leading end of the optical disk 2, among the empty areas registered in the current queue 101, to be an area for recording data therein.

In step S33, the controller 16 controls the drive 15 to record data inputted from the input data processor 11 in the empty area determined in step S32 on the optical disk 2.

In step S34, the controller 16 changes the area information of the empty area where the data has been recorded, depending on the amount of the recorded data. Specifically, the area start position and size of that empty area are changed to those representing the empty area which are generated after the data has been recorded therein.

In step S35, the controller 16 determines whether all the data to be recorded has been recorded on the optical disk 2 or not. If certain data remains to be recorded, then control goes back to step S31 and the processing from step S31 will be performed.

If it is judged that all the data to be recorded has been recorded on the optical disk 2 in step S35, then control proceeds to step S36 in which the controller 16 changes the recording start position in the recording start position column 104 in the memory 12 to a data recording end position, i.e., the position where the last data has been recorded in step S33.

If it is judged that no empty areas are recorded in the current queue 101 in step 531, then control goes to step S37 in which the controller 16 increments the recording count in the recording count column 103 by 1. In step S38, the controller 16 resets the recording start position in the recording start position column 104 to the leading position (position 00000) on the optical disk 2.

In step S39, the controller 16 moves the empty areas registered in the next queue 102 to the current queue 101. As a result, the next queue 102 becomes empty.

In step S40, the controller 16 determines whether empty areas are recorded in the current queue 101 or not. If it is judged that empty areas are recorded in the current queue 101, then control returns to step S32 and the processing from step S32 will be performed.

If it is judged that no empty areas are recorded in the current queue 101 in step S40, then control goes to step S41 in which the controller 16 controls the display 14 to display an error message representing a recording failure.

After the recording start position in the recording start position column 104 is changed in step S36 or the error message is displayed in step S41, control returns to step S4 shown in FIG. 2.

The data deleting process in step S5 will be described below with reference to the flowchart of FIG. 8.

In step S51, the controller 16 controls the drive 15 to delete data, which is indicated by the console 13 operated by the user, for example, from the optical disk 2.

Deleting data may refer to actually deleting data or handling data as if deleted.

In step S52, the controller 16 determines whether the area from which the data has been deleted in step S51, i.e., the area which has become empty or the area which is regarded as having the data deleted therefrom, is positioned forward of the recording start position in the recording start position column 104 or not. If it is judged that the area is positioned forward of the recording start position in the recording start position column 104, then control goes to step S53 in which the controller 16 registers the area from which the data has been deleted, i.e., the empty area, in the next queue 102. The area information of the empty areas that are set in the next queue 102 at this time is sorted according to the sequence of the area leading positions.

In step S54, the controller 16 determines whether adjacent empty areas, i.e., successive empty areas, are registered in the next queue 102 or not. If it is judged that such adjacent empty areas are registered in the next queue 102, then control goes to step S55 in which the controller 16 combines area information of those adjacent empty areas.

If it is judged that no adjacent empty areas are registered in the next queue 102 in step S54 or after the area information of the registered adjacent empty areas is combined in step S55, control returns to step S6 shown in FIG. 2.

If it is judged that the area from which the data has been deleted is positioned not forward of, i.e., is positioned rearward of, the recording start position in the recording start position column 104 in step S52, then control goes to step S56 in which the controller 16 registers the area from which the data has been deleted, i.e., the empty area, in the current queue 101. The area information of the empty areas that are set in the current queue 101 at this time is sorted according to the sequence of the area leading positions.

In step S57, the controller 16 determines whether adjacent empty areas, i.e., successive empty areas, are registered in the current queue 101 or not. If it is judged that such adjacent empty areas are registered in the current queue 101, then control goes to step S58 in which the controller 16 combines area information of those adjacent empty areas.

If it is judged that no adjacent empty areas are registered in the current queue 101 in step S57 or after the area information of the registered adjacent empty areas is combined in step S58, control returns to step S6 shown in FIG. 2.

The data recording process (step S3 shown in FIG. 2 (FIG. 7) and the data deleting process (step S5 shown in FIG. 2 (FIG. 8) will be described in detail by way of specific example.

It is assumed that data having a size 4000 will be recorded on the optical disk 2 having empty areas as shown in FIG. 5.

Figure 7:
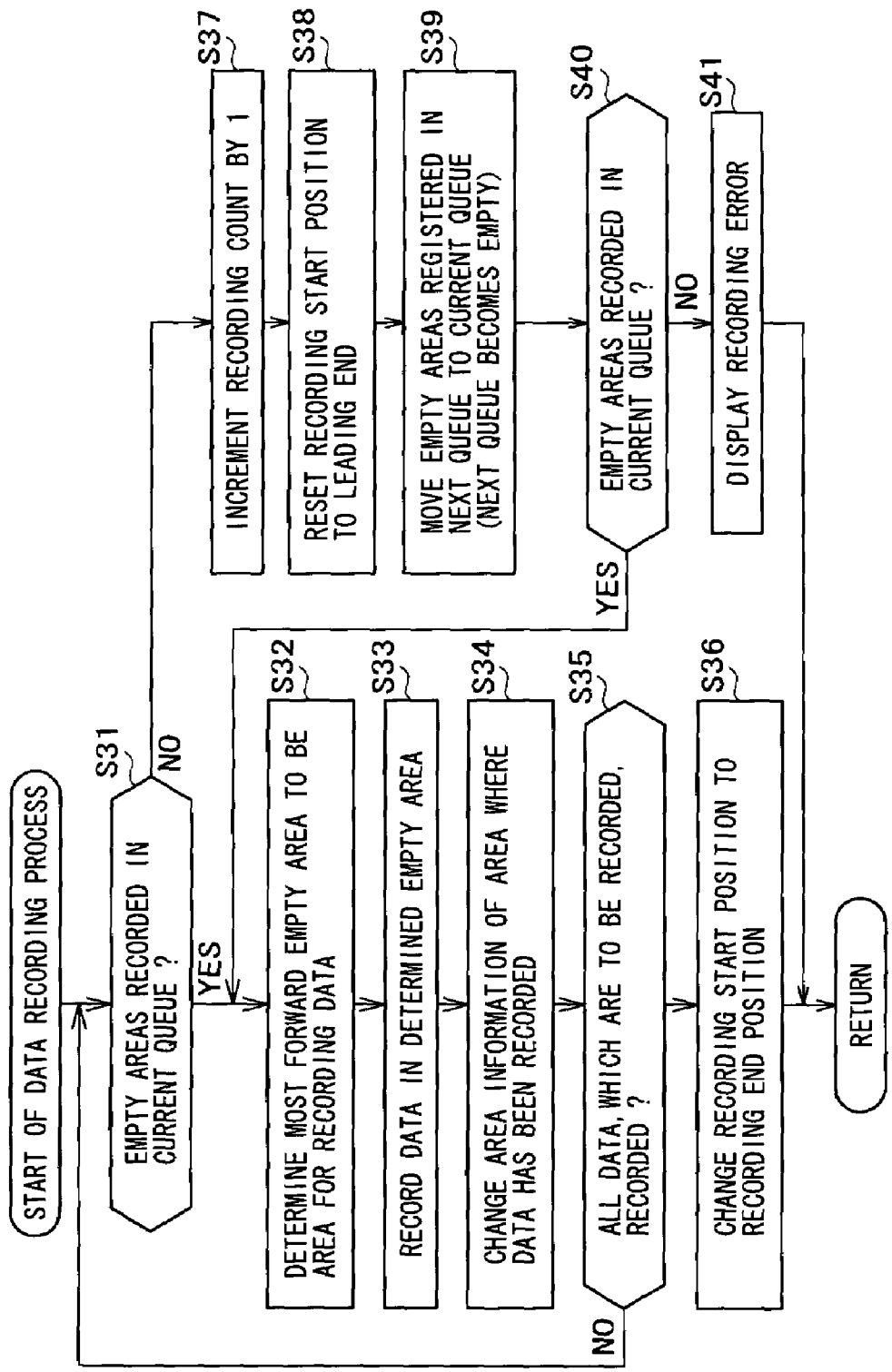
FIG. 7 is a flowchart of a processing sequence in step S3 of the editing process shown in FIG. 2.

Since the memory 12 stores the current queue 101, the next queue 102, the recording count column 103, and the recording start position column 104 as shown in FIG. 6, the answer to step S31 shown in FIG. 7 is YES, and control goes to step S32 in which the controller 16 determines the empty area positioned most forwardly in terms of addresses among the empty areas registered in the current queue 101, to be an area for recording data therein. In step S34, the area information of the empty area A where the data having the size of 4000 is recorded is changed to "area leading position=05000, size=3000". The empty area A whose area information has thus been changed is referred to as an empty area A'.

Since the data having the size of 4000 has all been recorded in the empty area A, the answer to step S35 is YES, and control goes to step S36. In step S36, the recording start position in the recording start position column 104 is changed to the position 05000. Thereafter, control returns to step S4 shown in FIG. 2.

It is assumed that data having a size of 7000 will then be recorded. Since the empty area A', B, C, D have been recorded in the current queue 101 (see FIG. 10), the answer to step S31 is YES, and control goes to step S32 in which the empty area A' is determined to be an area for recording data therein. In step S33, of the data having the size of 7000, data having a size of 3000 is recorded in the empty area A'. In step S34, as shown in FIG. 11, the area information of the empty area A' where the data having the size of 3000 is recorded is deleted from the current queue 101.

In step S35, it is judged that data remains to be recorded, i.e., data having a size of 4000 remains to be recorded. Control then goes back through step S31 to step S32.

Figure 12:
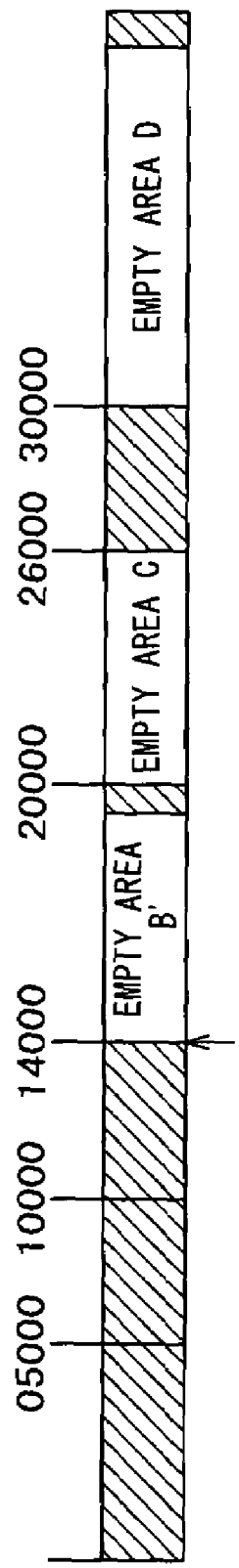
FIG. 12 is a diagram showing another recorded state of data on the optical disk shown in FIG. 1.

In step S32, the empty area B (see FIG. 11) is determined to be an area for recording data therein. In step S33, the remaining data having the size of 4000 is recorded in the empty area B from its leading end (position 10000), as shown in FIG. 12. In step S34, as shown in FIG. 13, the area information of the empty area B where the data having the size of 4000 is recorded is changed to "area leading position=14000, size=5000". The empty area B whose area information has thus been changed is referred to as an empty area B'.

In step S35, it is judged that all the data having the size of 7000 has been recorded. Control then goes to step S36 in which the recording start position in the recording start position column 104 is changed to the position 14000 as shown in FIG. 13. Thereafter, control returns to step S4 shown in FIG. 2.

It is assumed that data having a size of 2000 will now be deleted from the position 26000 on the optical disk 2 on which the data has been recorded as shown in FIG. 12. At this time, the memory 12 stores the current queue 101, the next queue 102, the recording count column 103, and the recording start position column 104 as shown in FIG. 13.

Figure 8:
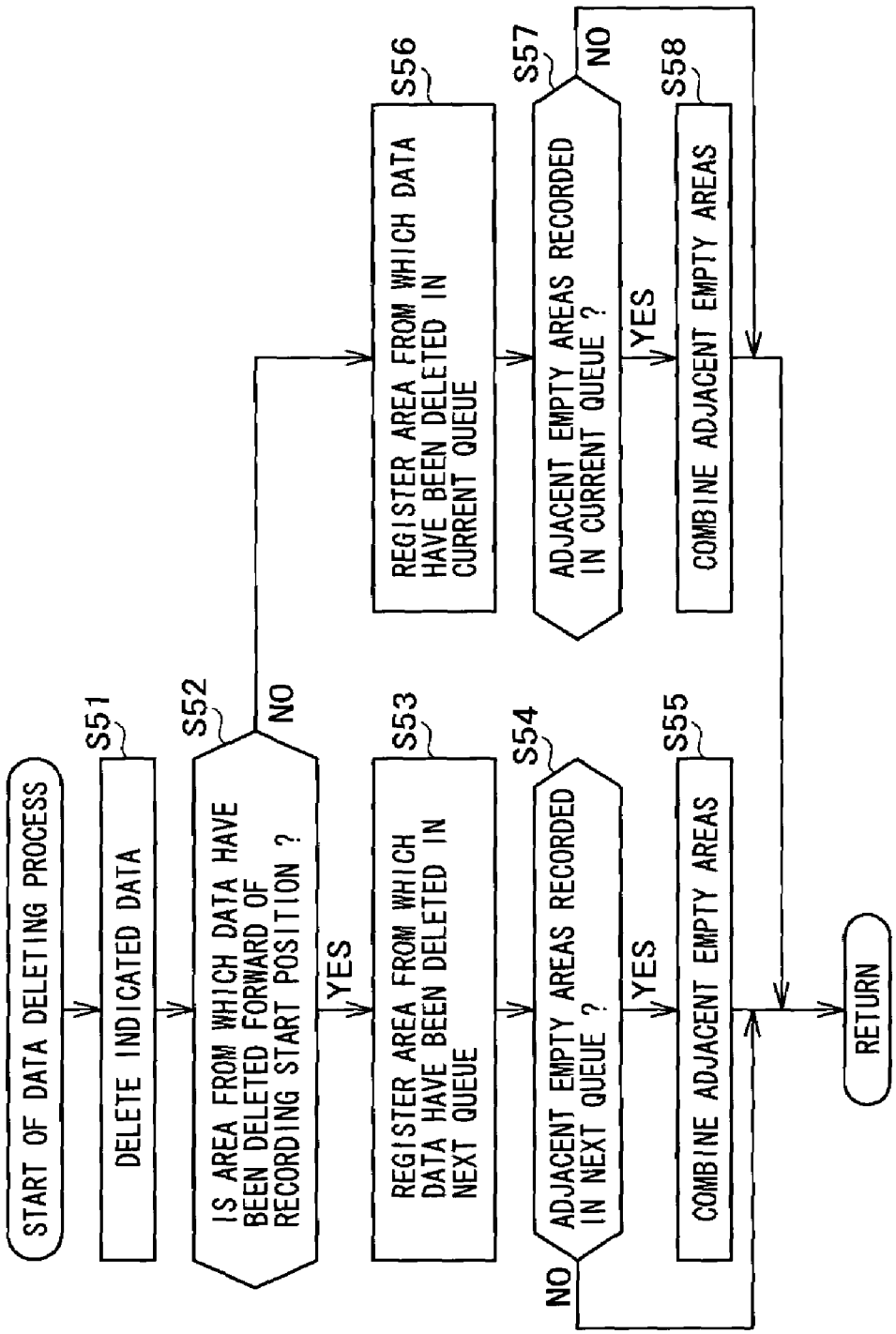
FIG. 8 is a flowchart of a processing sequence in step S5 of the editing process shown in FIG. 2.
Figure 9:
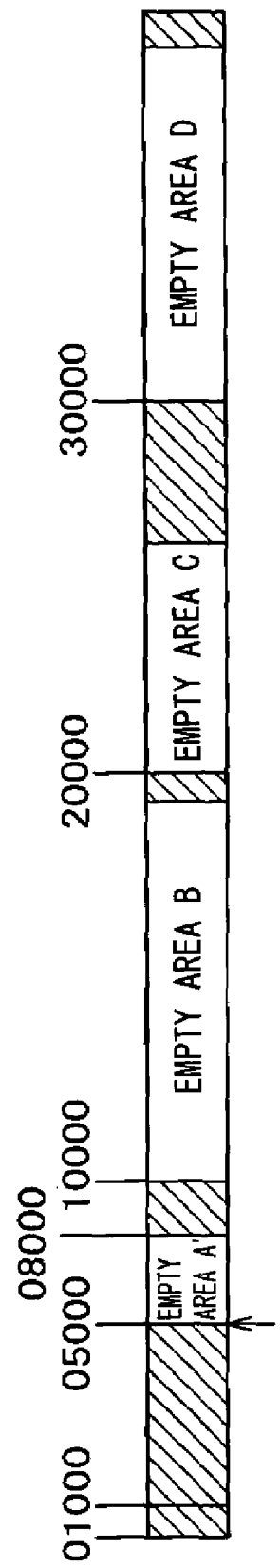
FIG. 9 is a diagram showing another recorded state of data on the optical disk shown in FIG. 1.
Figure 14:
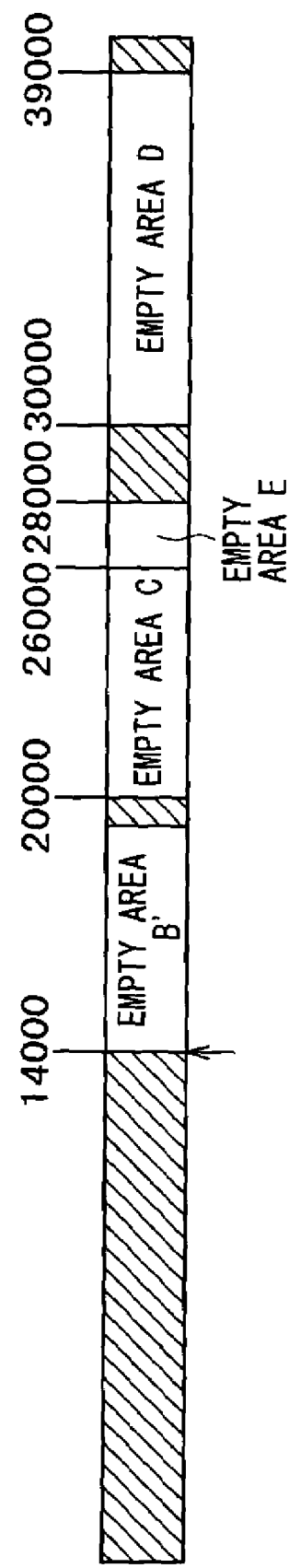
FIG. 14 is a diagram showing another recorded state of data on the optical disk shown in FIG. 1.

In step S51 shown in FIG. 8, data having a size of 2000 is deleted from the position 26000 on the optical disk 2 as shown in FIG. 14. Since the area from which the data has been deleted, i.e., the empty area E, is not positioned forward of, i.e., is positioned rearward of, the recording start position (position 14000) in the recording start position column 104 (the position indicated by the upward arrow in FIG. 14), the answer to step S52 is NO, and control goes to step S56.

Figure 15:
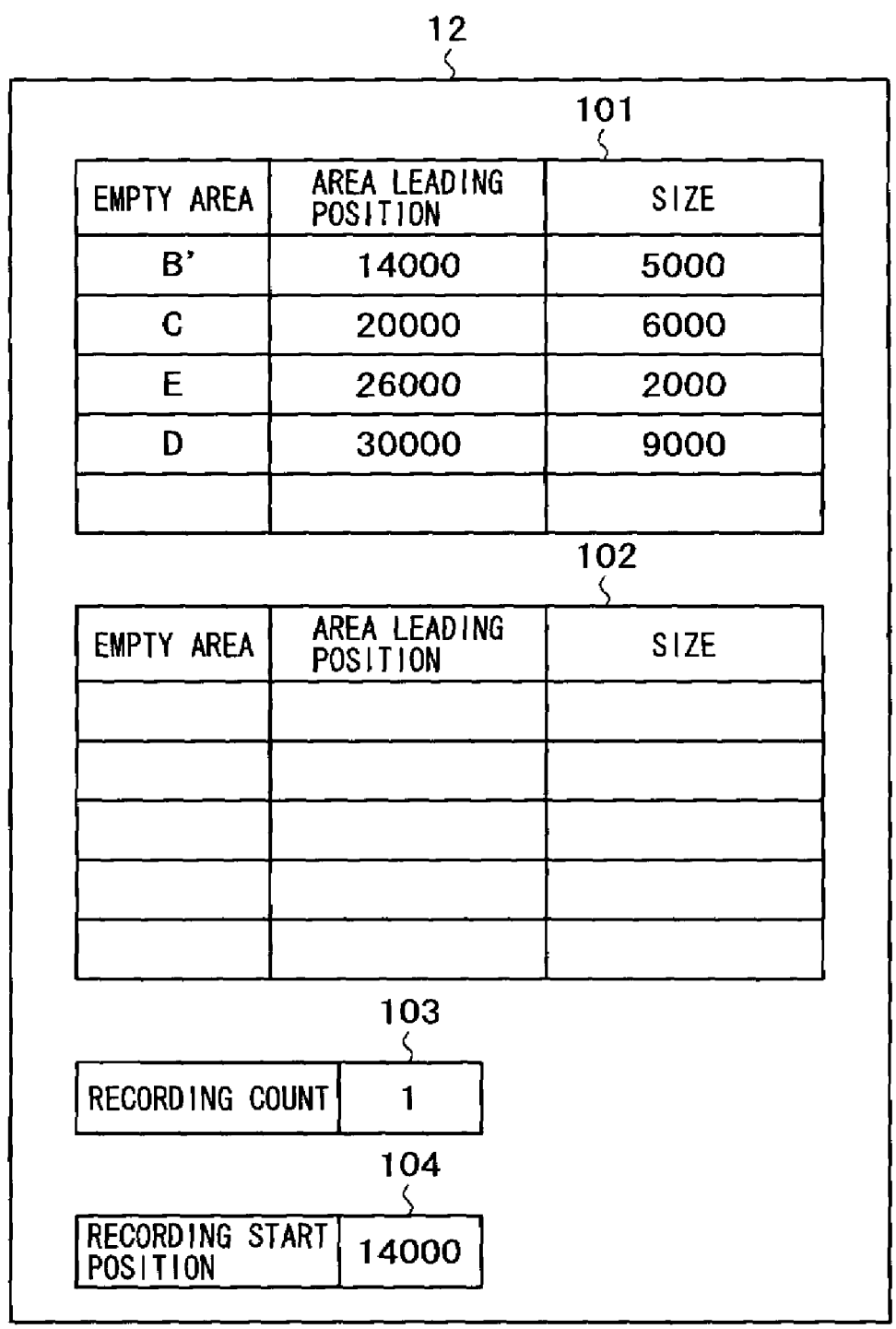
FIG. 15 is a diagram showing other contents stored in the memory shown in FIG. 1.

In step S56, the empty area E is registered in the current queue 101 as shown in FIG. 15. Because the area information is sorted according to the sequence of the area leading positions, the area information "area leading position=26000, size=2000" of the empty area E is set between the area information of the empty area C and the area information of the empty area D.

Figure 16:
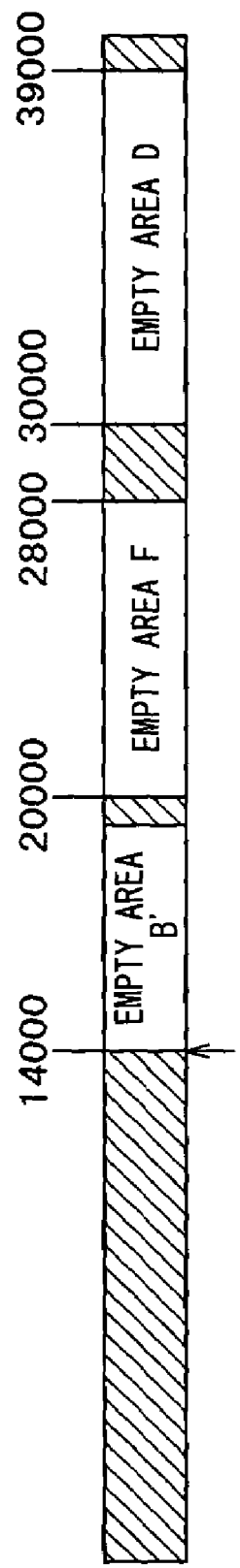
FIG. 16 is a diagram showing another recorded state of data on the optical disk shown in FIG. 1.

Inasmuch as the empty area C and the empty area E are now positioned adjacent each other in the current queue 101, the answer to step S57 is YES, and control goes to step S58 in which the area information of the empty area C and the area information of the empty area E are combined into area information of the empty area F as shown in FIG. 16 and FIG. 17. Thereafter, control returns to step S6 shown in FIG. 2.

It is assumed that data having a size 4000 will then be deleted from the position 01000. After the data is deleted in step S51 as shown in FIG. 18, since the area from which the data is deleted, i.e., the empty area G, is positioned forward of the recording start position (position 14000) in the recording start position column 104, the answer to step S52 is YES, and the empty area G is registered in the next queue 102 in step S53 as shown in FIG. 19.

Because no adjacent empty areas are now registered in the next queue 102, the answer to step S54 is NO, after which control returns to step S6 shown in FIG. 2.

It is assumed that data having a size 2000 will then be deleted from the position 12000. After the data is deleted in step S51 as shown in FIG. 20, since the area from which the data is deleted, i.e., the empty area H, is positioned forward of the recording start position (position 14000) in the recording start position column 104, the answer to step S52 is YES, and control goes to step S53.

In step S53, the empty area H is registered in the next queue 102 as shown in FIG. 21. Because the area information is sorted according to the sequence of the area leading positions, the area information "area leading position=12000, size=2000" of the empty area H is set next to the area information of the empty area G.

As the empty area G and the empty area H that are registered in the next queue 102 are not adjacent to each other, the answer to step S54 is NO, and control returns to step S6 shown in FIG. 2. In FIG. 20, through the empty area H and the empty area B' are positioned adjacent to each other, their area information is not combined because the empty area H is registered in the next queue 102 and the empty area B' registered in the current queue 101.

Figure 22:
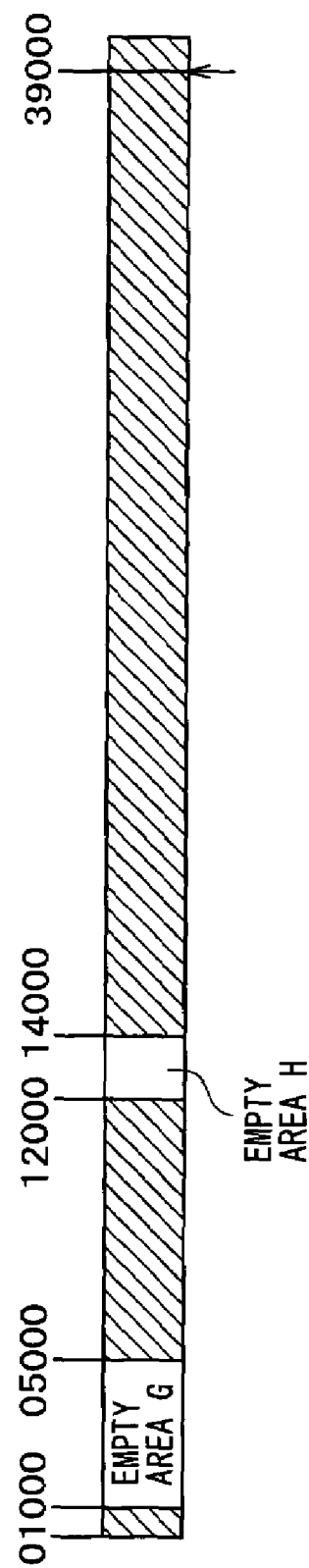
FIG. 22 is a diagram showing another recorded state of data on the optical disk shown in FIG. 1.

It is now assumed that data is repeatedly recorded on the optical disk 2 on which the data has been recorded as shown in FIG. 20, i.e., the processing in steps S31 through S36 shown in FIG. 7 is repeated, and data is further recorded when no empty area is present after the recording start position (position 39000) in the recording start position column 104 as shown in FIG. 22.

At this time, the memory 12 stores the current queue 101, the next queue 102, the recording count column 103, and the recording start position column 104 as shown in FIG. 23.

Figure 25:
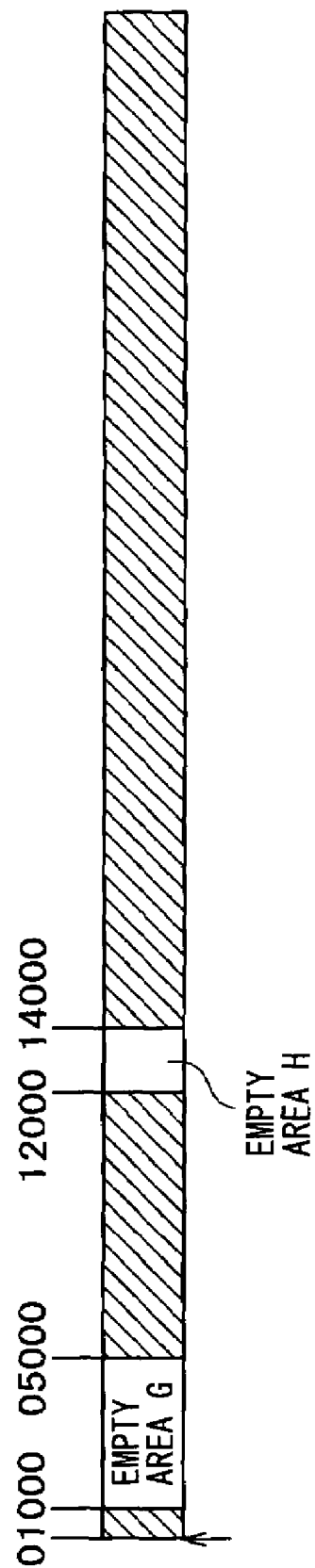
FIG. 25 is a diagram showing another recorded state of data on the optical disk shown in FIG. 1.

When the current queue 101 becomes empty, the answer to step S31 shown in FIG. 7 is NO, and control goes to step S37 in which the recording count in the recording count column 103 is incremented by 1 and reaches 2 as shown in FIG. 24. In step S38, as shown in FIG. 24, the recording start position in the recording start position column 104 is reset to the leading position (position 00000) of the optical disk 2 (FIG. 25).

In step S39, the area information of the empty areas G, H registered in the next queue 102 (FIG. 24) is moved to the current queue 101 as shown in FIG. 26. Therefore, the answer to step S40 is YES, and control goes to step S32.

In step S32, the empty area G is determined to be an area for recording data therein. In step S33, data is recorded in the empty area G.

Figure 28:
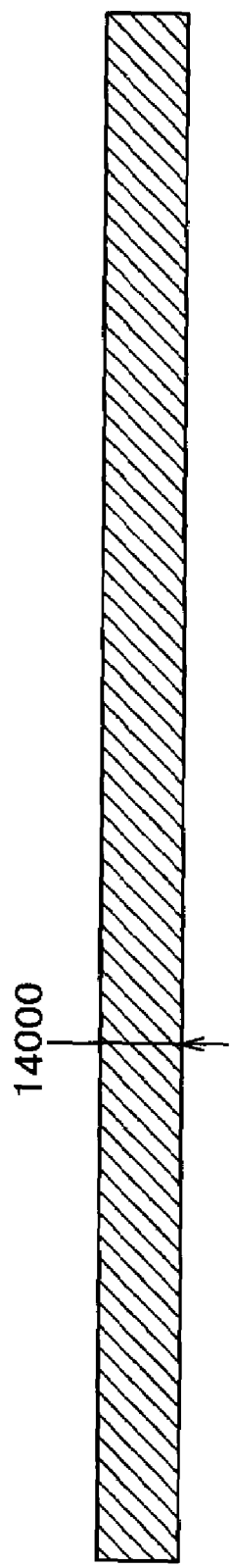
FIG. 28 is a diagram showing another recorded state of data on the optical disk shown in FIG. 1.

Data is further recorded, and when the current queue 101 becomes empty again (when data is recorded on the optical disk 2 as shown in FIG. 28) as shown in FIG. 27, data is further recorded. At this time, the recording start position in the recording start position column 104 is the position 14000.

Figure 30:
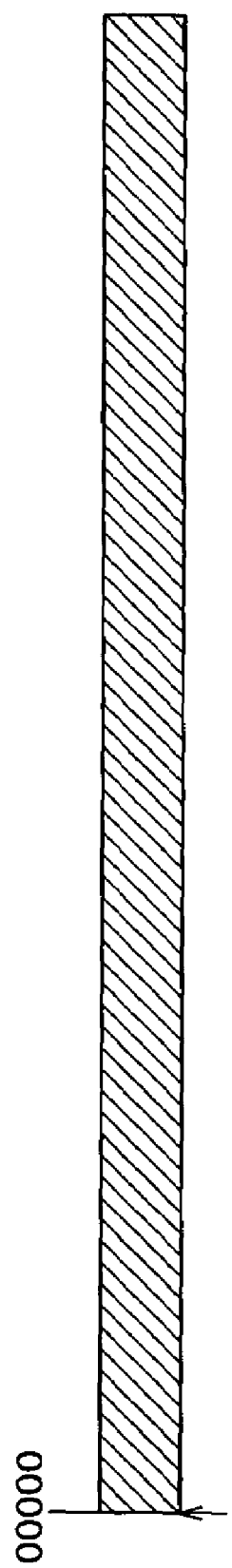
FIG. 30 is a diagram showing another recorded state of data on the optical disk shown in FIG. 1.

Since no empty area is registered in the current queue 101, the answer to step S31 is NO, and control goes to step S37 in which the recording count in the recording count column 103 is incremented by 1 and reaches 3 as shown in FIG. 29. In step S38, as shown in FIG. 29, the recording start position in the recording start position column 104 is reset to the leading position (position 00000) of the optical disk 2 (FIG. 30).

In step S39, empty areas registered in the next queue 102 are moved to the current queue 101. At this time, however, since the next queue 102 is empty as shown in FIG. 29, no empty area is registered in the current queue 101 after all. The answer to step S40 is NO, and an error message indicating a recording failure is displayed on the display 14 in step S41.

The data recording and the data deletion are controlled as described above. When the data in the area from the position 12000 through the position 14000 in FIG. 20, for example, is deleted, since no data is recorded in the area (the empty area H) until data is recorded in the empty area B', the empty area F, the empty area D, and the empty area G, data is prevented from being repeatedly recorded in the empty area H (certain position). Therefore, the rewriting counts in the respective recording areas of the optical disk 2 are uniformized.

The rewriting counts in respective sectors of the optical disk 2 may be uniformized by individually managing the rewriting counts in the respective sectors of the optical disk 2. However, if the rewriting counts in one million sectors, for example, are counted by 2 bytes, then a storage capacity of about 2 MB will be necessary. Determining rewriting locations based on the counted rewriting counts requires complex calculations and is time-consuming. Therefore, it is not practical to uniformize the rewriting counts in respective sectors of the optical disk 2.

According to the embodiment of the present invention, data to be stored are only data in the current queue 101, the next queue 102, the recording count column 103, and the recording start position column 104, and no complex calculations are required because rewriting locations are determined based on the positions of empty areas that are registered in the current queue 101.

Figure 3:
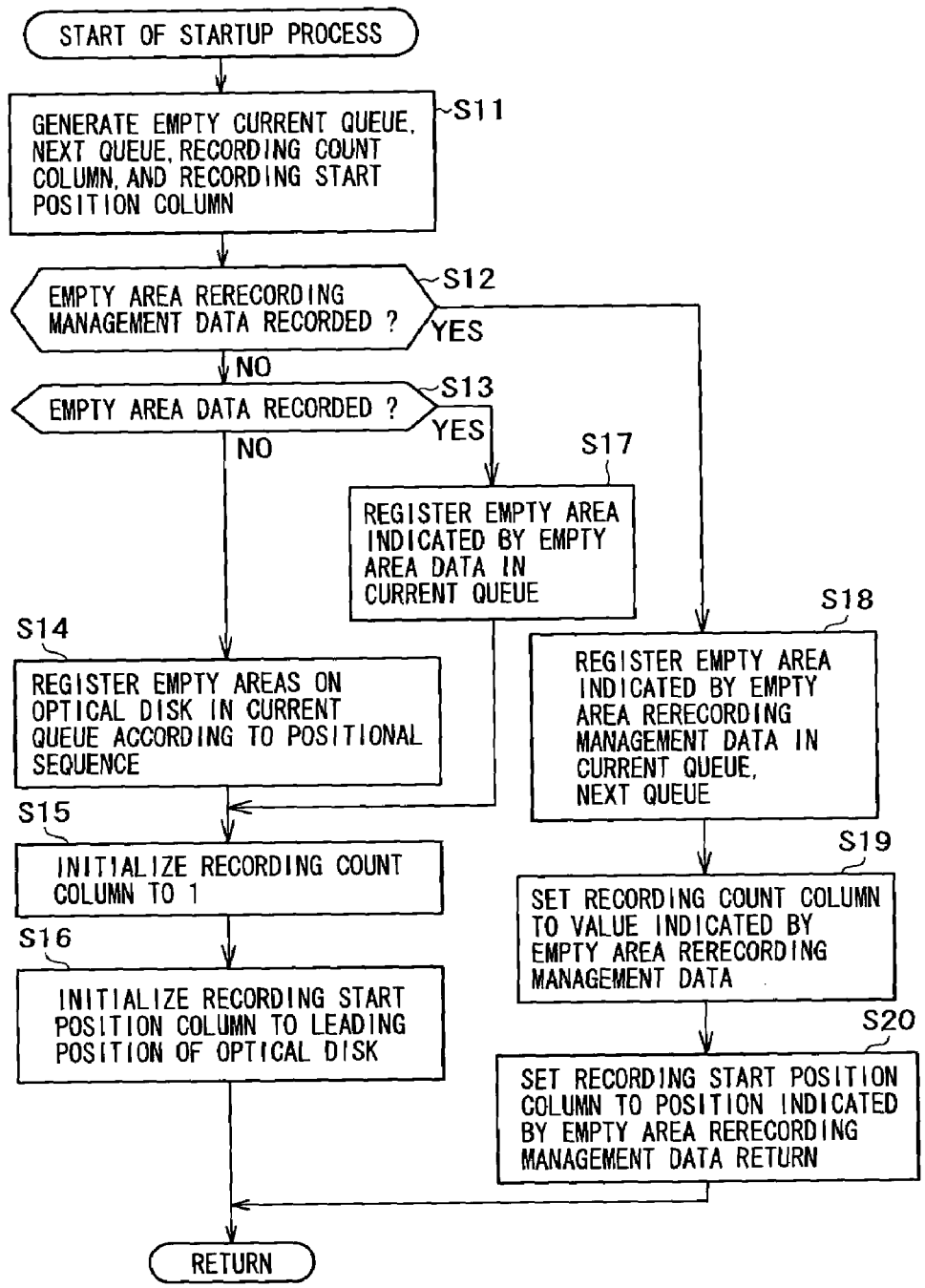
FIG. 3 is a flowchart of a processing sequence in step S1 of the editing process shown in FIG. 2.

In the startup process, if empty area rewriting management data is recorded in step S12 shown in FIG. 3, then empty areas indicated by the empty area rewriting management data are registered in the current queue 101 or the next queue 102 in step S18. However, empty areas that are currently present on the optical disk 2 may be distributed and registered in the current queue 101 or the next queue 102 based on the data (recording start position) set in the recording start position column 104, among the empty area rewriting management data.

A startup process according to such a modification will be described below with reference to FIG. 31.

Figure 4:
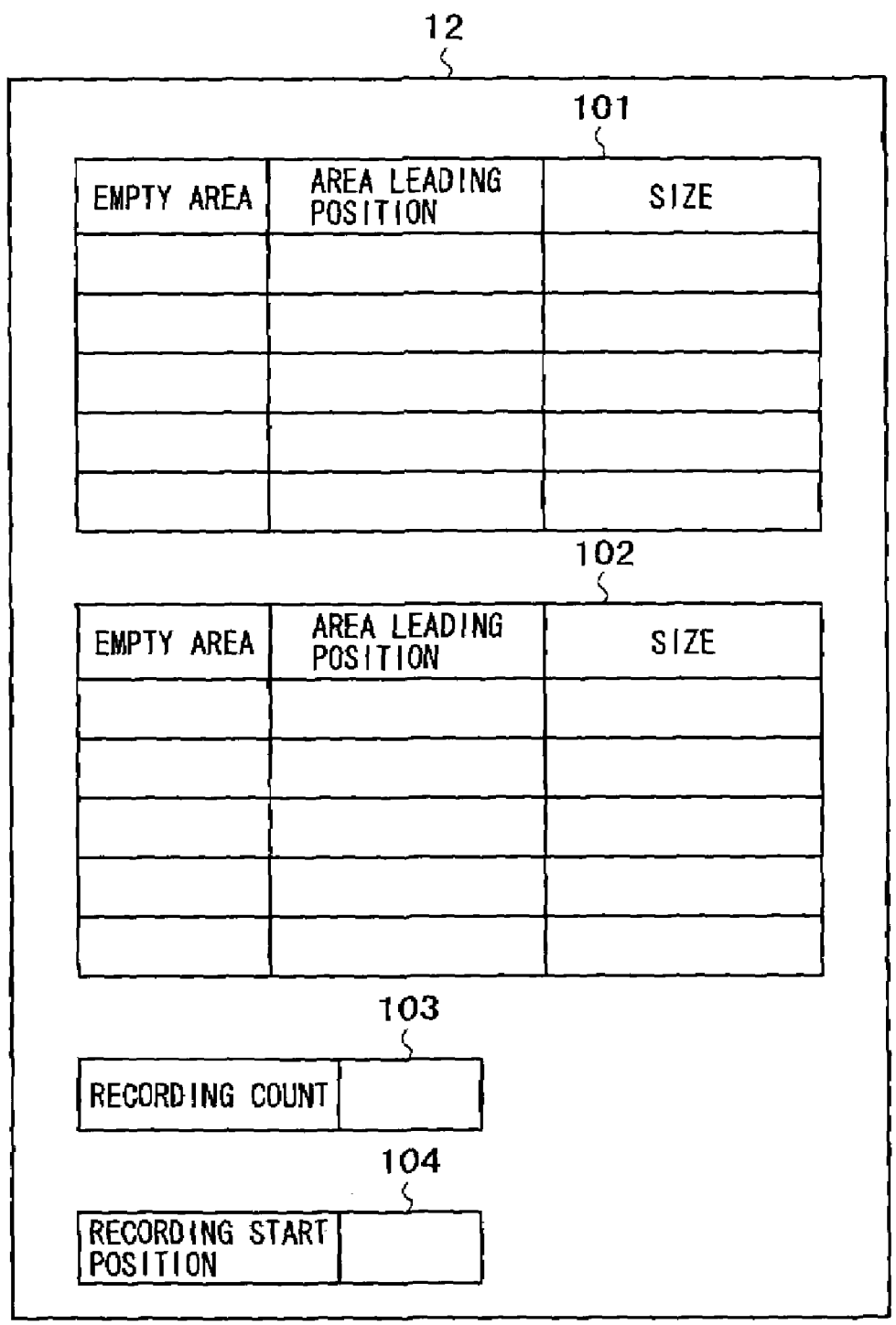
FIG. 4 is a diagram showing contents stored in a memory shown in FIG. 1.
Figure 31:
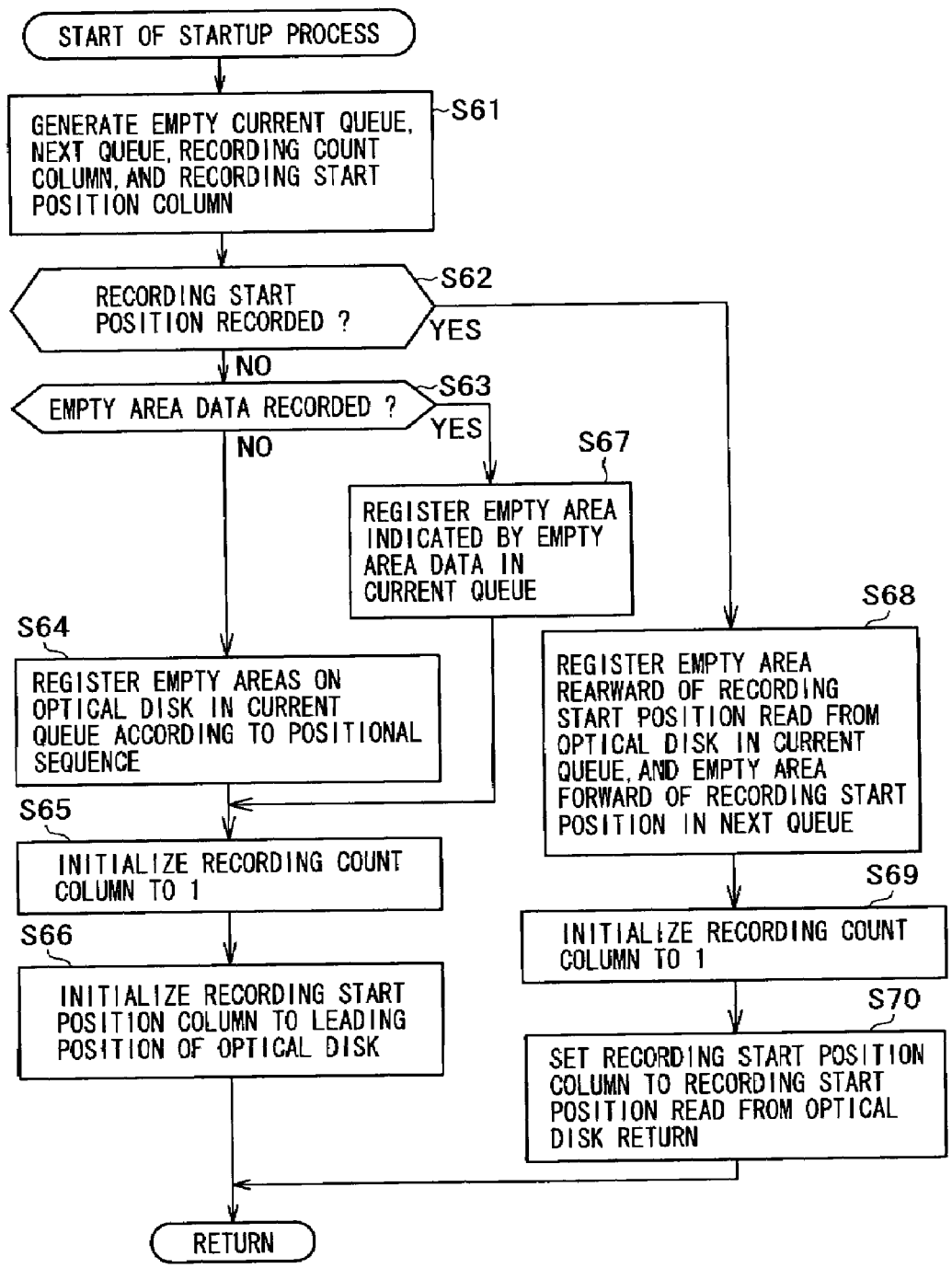
FIG. 31 is a flowchart of another processing sequence in step S1 of the editing process shown in FIG. 2.

In step S61 shown in FIG. 31, the controller 16 generates a current queue 101, a next queue 102, a recording count column 103, and a recording start position column 104 in the memory 12, as shown in FIG. 4.

In step S62, the controller 16 determines whether a recording start position is recorded as empty area rewriting management data on the optical disk 2 or not. If it is judged that a recording start position is recorded, then control goes to step S68 in which the controller 16 reads the recording start position, registers those empty areas positions rearward of the read recording start position, among the empty areas that are present on the optical disk 2 at the time it is inserted, in the current queue 101, and registers those empty areas positioned forward of the read recording start position in the next queue 102.

In step 569, the controller 16 initializes the recording count column 103 to 1. In step S70, the controller 70 sets the recording start position column 104 to the recording start position read in step S68.

In steps S63 through S67, the controller 16 performs the same processing as in steps S13 through S17 shown in FIG. 3. Therefore, the processing in steps S63 through S67 will not be described below.

In the above embodiment, an area for recording data therein is determined based on the positions of empty areas. However, an area for recording data therein may be determined based on the sizes of empty areas. The startup process in step S1 shown in FIG. 2, the data recording process in step S3 shown in FIG. 2, and the data deleting process in step S5 shown in FIG. 2 for such a modification will be described below.

First, the startup process will be described below with reference to FIG. 32.

In step S81 shown in FIG. 33, the controller 16 generates a current queue 101, a next queue 102, and a recording count column 103 in the memory 12 (and does not generate a recording start position column). When the current queue 101, the next queue 102, and the recording count column 103 are generated, they are empty.

In steps S82, S83, the controller 16 performs the same processing as in steps S12, S13 shown in FIG. 3. Therefore, the processing in steps S82, S83 will not be described below.

If it is judged that no empty area data is recorded in the optical disk 2 in step S83, then the controller 16 registers area information of all empty areas that are present on the optical disk 2 when it is inserted (the area information may represent the start positions and sizes of the empty areas) in the current queue 101 generated in the memory 12 according to the sequence of the sizes of the empty areas in step S84.

For example, as shown in FIG. 5, if empty areas A, B, C, D are present on the optical disk 2, then the start positions and sizes of those empty areas B, D, A, C are set in the current queue 101 according to the sequence of the sizes, as shown in FIG. 33. If two or more empty areas have the same size, then they are set according to the sequence of the area leading positions.

In step S85, the controller 16 initializes the recording count column 103 generated in the memory 12 to 1, as shown in FIG. 33.

If it is judged that empty area data is recorded in step S83, then control goes to step S86 in which the controller 16 registers area information of empty areas represented by the empty area data in the current queue 101 in the memory 12 according to the sequence of the sizes. Thereafter, control proceeds to step S85.

If it is judged that empty area rewriting management data is recorded in step S82, then control goes to step S87. The empty area rewriting management data refers to all data set respectively in the current queue 101, the next queue 102, and the recording count column 103 as shown in FIG. 33, and is recorded on the optical disk 2 which has been edited, in step S7.

In step S87, the controller 16 registers empty areas (their area information) registered in the current queue 101 which are contained in the empty area rewriting management data, in the current queue 101 generated in the memory 12, and also registers empty areas registered in the next queue 102 which are contained in the empty area rewriting management data, in the next queue 102 generated in the memory 12. In step S88, the controller 16 sets the writing count column 103 generated in the memory 12 to the value set in the writing count column 103 which is contained in the empty area rewriting management data.

After the recording count column 103 is set to the given value in step S85 or S88, then control returns to step S2 shown in FIG. 2.

The data recording process (step S3 shown in FIG. 2) for the above modification will be described below with reference to FIG. 34.

Figure 32:
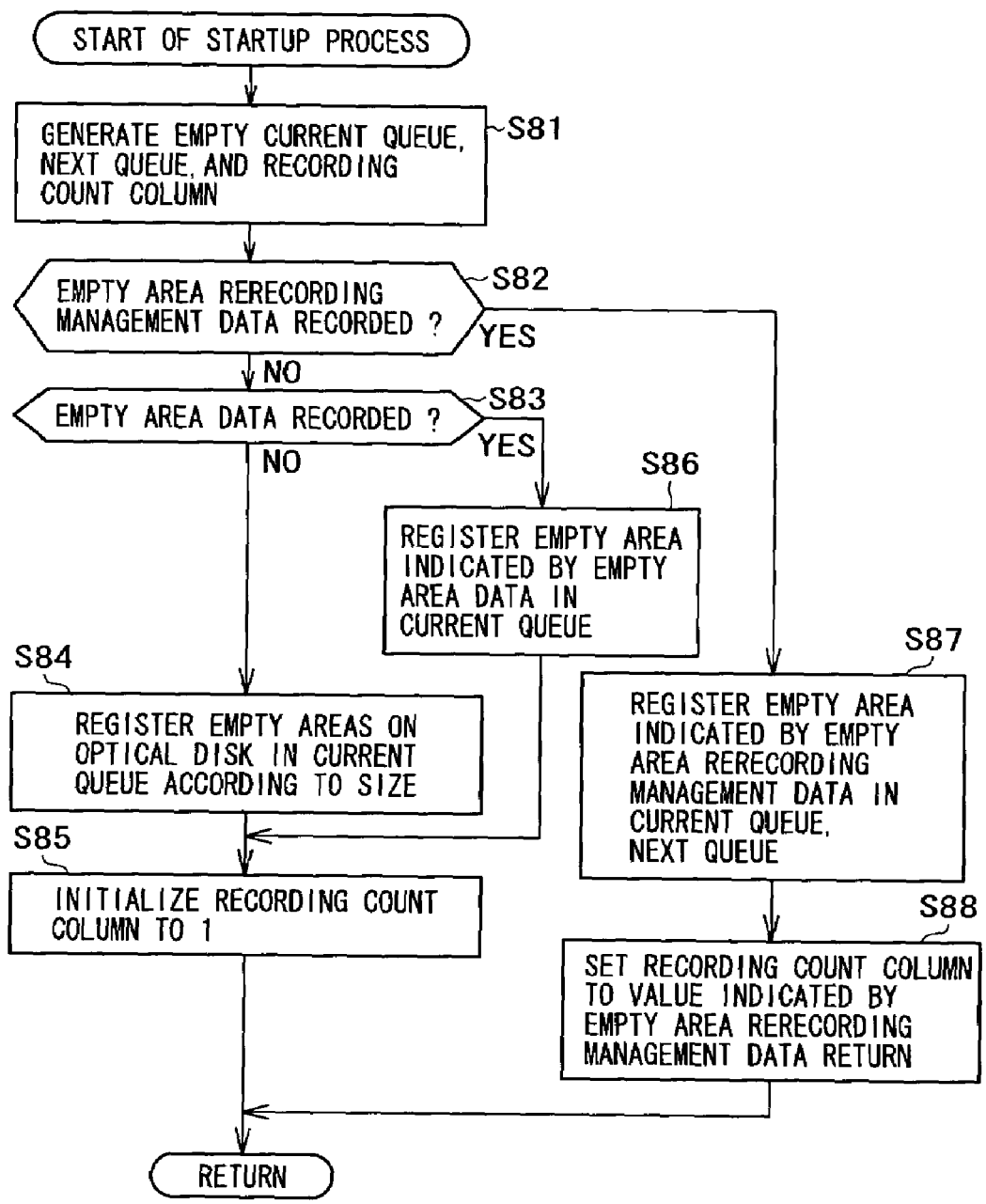
FIG. 32 is a flowchart of still another processing sequence in step S1 of the editing process shown in FIG. 2.
Figure 34:
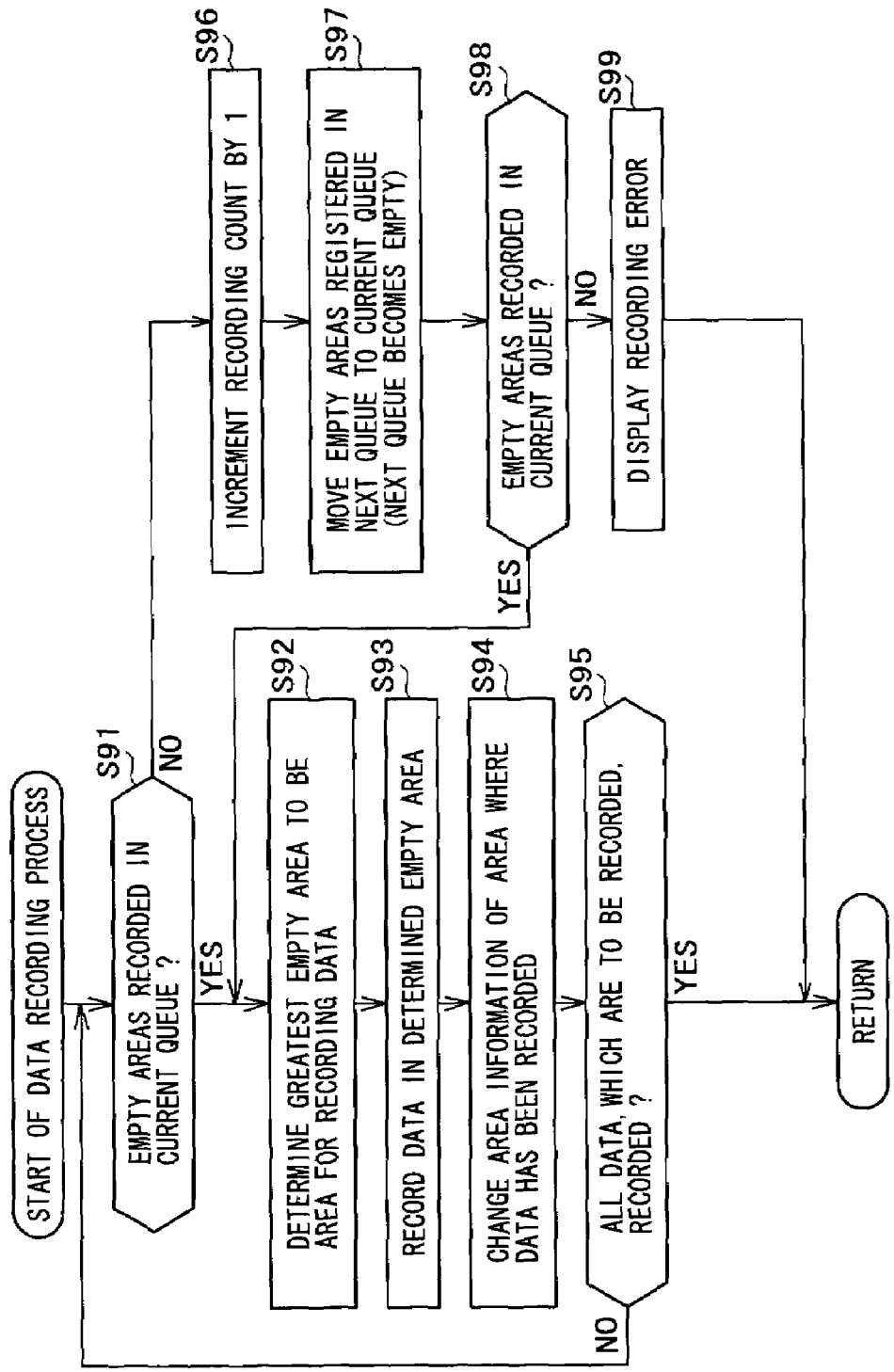
FIG. 34 is a flowchart of another processing sequence in step S3 of the editing process shown in FIG. 2.

In step S91 shown in FIG. 34, the controller 16 determines whether empty areas are recorded in the current queue 101 generated in the memory 12 or not in step S84, S86, or S87 shown in FIG. 32. If it is judged that empty areas are recorded in the current queue 101, then control goes to step S92 in which the controller 16 determines the empty area of the greatest size among the empty areas registered in the current queue 101, to be an area for recording data therein.

In step S93, the controller 16 controls the drive 15 to record data inputted from the input data processor 11 in the empty area determined in step S92 on the optical disk 2.

In step S94, the controller 16 changes the area information of the empty area where the data has been recorded, depending on the amount of the recorded data.

In step S95, the controller 16 determines whether all the data to be recorded has been recorded on the optical disk 2 or not. If certain data remains to be recorded, then control goes back to step S91 and the processing from step S91 will be performed.

If it is judged that no empty areas are recorded in the current queue 101 in step S91, then control goes to step S96 in which the controller 16 increments the recording count in the recording count column 103 by 1.

In step S97, the controller 16 moves the empty areas registered in the next queue 102 to the current queue 101. As a result, the next queue 102 becomes empty.

In step S98, the controller 16 determines whether empty areas are recorded in the current queue 101 or not. If it is judged that empty areas are recorded in the current queue 101, then control returns to step S92 and the processing from step S92 will be performed.

If it is judged that no empty areas are recorded in the current queue 101 in step S98, then control goes to step S99 in which the controller 16 controls the display 14 to display an error message representing a recording failure.

After it is judged that all the data to be recorded has been recorded in step S95 or the error message is displayed in step S99, control returns to step S4 shown in FIG. 2.

The data deleting process (step S5 shown in FIG. 2) for the above modification will be described below with reference to FIG. 35.

In step S101, the controller 16 controls the drive 15 to delete data, which is indicated by the console 13 operated by the user, for example, from the optical disk 2.

In step S102, the controller 16 registers the area from which the data has been deleted in step S101, i.e., the empty area, in the next queue 102.

In step S103, the controller 16 determines whether adjacent empty areas, i.e., successive empty areas, are registered in the next queue 102 or not. If it is judged that such adjacent empty areas are registered in the next queue 102, then control goes to step S104 in which the controller 16 combines area information of those adjacent empty areas.

If it is judged that no adjacent empty areas are registered in the next queue 102 in step S103 or after the area information of the registered adjacent empty areas is combined in step S104, control returns to step S6 shown in FIG. 2.

The data recording process (FIG. 34) and the data deleting process (FIG. 35) will be will be described in detail by way of specific example.

It is assumed that data having a size 4000 will be recorded on the optical disk 2 having empty areas as shown in FIG. 5.

Figure 36:
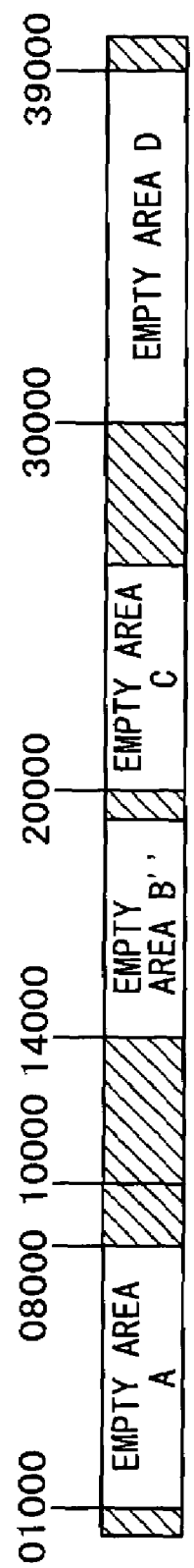
FIG. 36 is a diagram showing another recorded state of data on the optical disk shown in FIG. 1.

Since the memory 12 stores the current queue 101, the next queue 102, and the recording count column 103 as shown in FIG. 33, the answer to step S91 shown in FIG. 34 is YES, and control goes to step S92 in which the controller 16 determines the greatest empty area B among the empty areas registered in the current queue 101, to be an area for recording data therein. In step S93, the data having the size of 4000 is recorded in the empty area B from its leading end (position 10000), as shown in FIG. 36. In step S94, as shown in FIG. 37, the area information of the empty area B where the data having the size of 4000 is recorded is changed to "area leading position=14000, size=5000". The empty area B whose area information has thus been changed is referred to as an empty area B". Since the area information set in the current queue 101 is sorted according to size, the area information of the empty area B" is set finally.

Since the data having the size of 4000, which is to be recorded, has all been recorded in the empty area B, the answer to step S95 is YES, and control returns to step S4 shown in FIG. 2.

Figure 38:
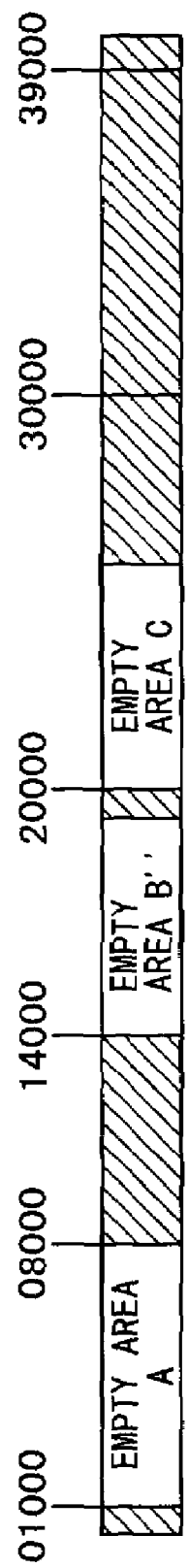
FIG. 38 is a diagram showing another recorded state of data on the optical disk shown in FIG. 1.

It is assumed that data having a size of 9000 will then be recorded. As empty areas D, A, C, B" have been recorded in the current queue 101 (FIG. 37), the answer to step S91 is YES, and control goes to step S92 in which the empty area D with the greatest size is determined to be an area for recording data therein. In step S93, the data having the size of 9000 is recorded in the empty area D from its leading end (position 30000) as shown in FIG. 38. In step S94, as shown in FIG. 39, the area information of the empty area D where the data having the size of 9000 is recorded is deleted from the current queue 101.

Since the data having the size of 9000, which is to be recorded, has all been recorded in the empty area D, the answer to step S95 is YES, and control returns to step S4 shown in FIG. 2.

It is assumed that the data having the size of 9000 (FIG. 38) recorded in the empty area D will be deleted.

Figure 35:
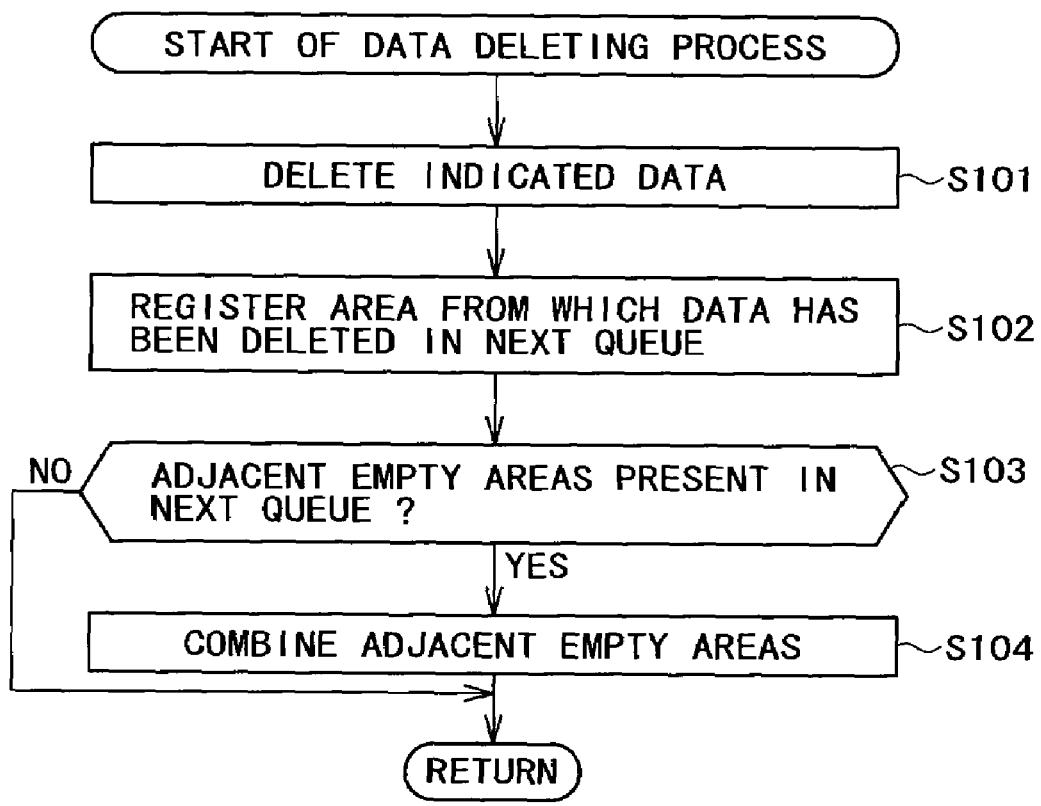
FIG. 35 is a flowchart of another processing sequence in step S5 of the editing process shown in FIG. 2.
Figure 40:
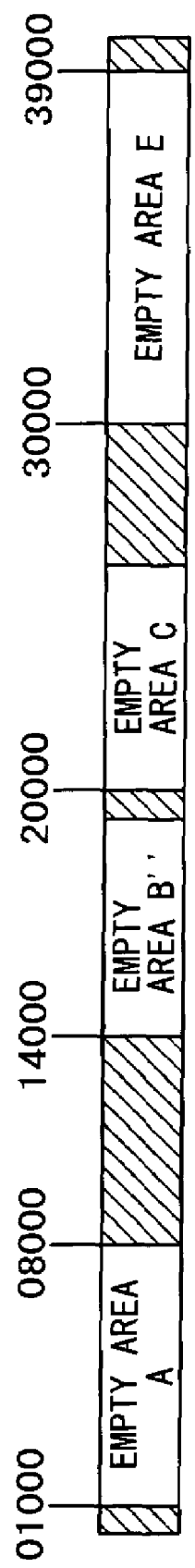
FIG. 40 is a diagram showing another recorded state of data on the optical disk shown in FIG. 1.

When the data is deleted in step S101 shown in FIG. 35, as shown in FIG. 40, the area from which the data has been deleted (the empty area E) is registered in the next queue 102 in step S102 as shown in FIG. 41.

Since no adjacent empty areas are now registered in the next queue 102, the answer to step S103 is NO, and control returns to step S6 shown in FIG. 2.

The data recording and the data deletion are controlled as described above. When the data in the area from the position 30000 through the position 39000 in FIG. 40, for example, is deleted, since no data is recorded in the area (the empty area E) until data is recorded in the empty area A, the empty area C, and the empty area B" (FIG. 41), data is prevented from being repeatedly recorded in the empty area E (certain location). Therefore, the rewriting counts in the respective recording areas of the optical disk 2 are uniformized.

While the processing sequences described above may be implemented by hardware, they may also be implemented by software. If the processing sequences are implemented by software, then a computer program representing the processing sequences is installed in a computer. When the installed computer program is run by the computer, the processing sequences are carried out as functions of the recording apparatus 1.

Figure 42:
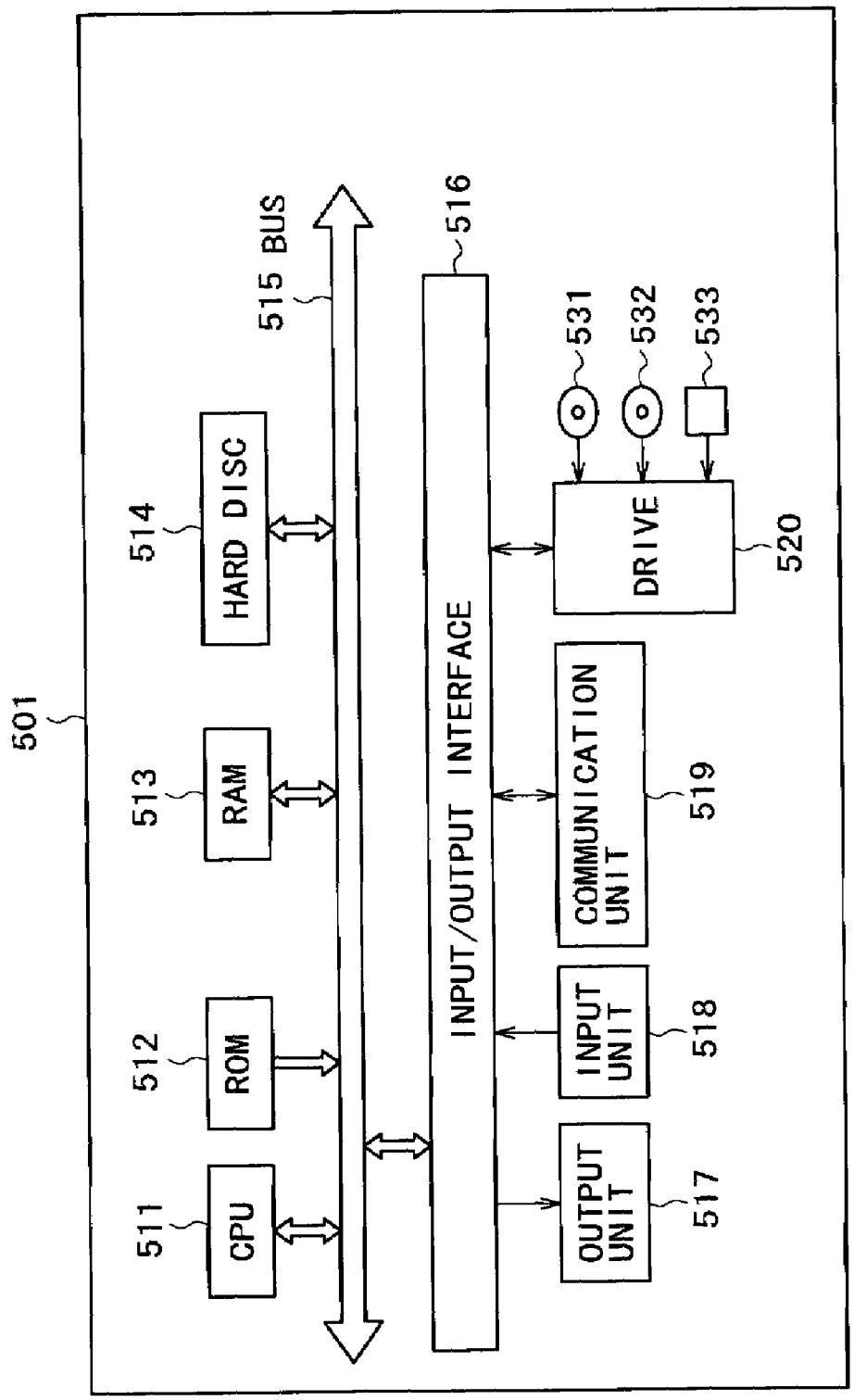
FIG. 42 is a block diagram showing an arrangement of a personal computer.

FIG. 42 shows in block form a computer 501 which functions as the recording apparatus 1. As shown in FIG. 42, the computer 501 has a CPU (Central Processing Unit) 511 to which there is connected an input/output interface 516 by a bus 515. When a command is inputted to the CPU 511 via the input/output interface 516 from an input unit 518 such as a keyboard, a mouse, or the like that is operated by the user, the CPU 511 loads a program that is stored in a ROM (Read Only Memory) 512, a hard disk 514, or a recording medium inserted in a drive 520 such as a magnetic disk 531, an optical disk 532, or a semiconductor memory 533, into a RAM (Random Access Memory) 513, and executes the program to perform the various processsing sequences described above. The CPU 511 outputs any processed results of the processing sequences through the input/output interface 516 to an output unit 517 which may comprise an LCD (Liquid Crystal Display) or the like. The program may be stored in the hard disk 514 or the ROM 512 in advance, and may be provided to the user in combination with the computer 501. Alternatively, the program may be provided to the user as a program stored in a package medium such as the magnetic disk 531, the optical disk 532, the semiconductor memory 533, or the like. Further alternatively, the program may be downloaded from a satellite, a network, or the like via a communication unit 519 to the hard disk 514.

In the above description, the steps that are descriptive of the program provided by the recording medium cover not only processes that are carried out chronologically according to the sequence in which they are described, but also processes that are carried out concurrently or individually, rather than chronologically.

Although certain preferred embodiments of the present invention have been shown and described in detail, it should be understood that various changes and modifications may be made therein without departing from the scope of the appended claims.

What is claimed is:

1. A recording apparatus, comprising:
determining means for determining a sequence to record input data in empty areas among recording areas of a recording medium for uniformerly recording counts in respective recording areas;
recording means for recording said input data in said empty areas according to the sequence determined by said determining means;
registering means for registering said empty areas present on said recording medium in a first queue before said input data is recorded in said empty areas by said recording means, and, when said input data is recorded in said empty areas registered in said first queue, deleting the empty areas in which said input data has been recorded from said first queue, and registering empty areas from which data has been deleted in a second queue; and
moving means for moving said empty areas registered in said second queue to said first queue when said first queue becomes empty,
wherein said recording means records said input data in said empty areas registered in said first queue according to the sequence determined by said determining means.

2. An apparatus according to claim 1, wherein said determining means determins a sequence to record input data in said empty areas registered in said first queue for uniformerly recording counts in the respective recording areas, and said moving means moves said empty areas registered in said second queue to said first queue while keeping the sequence of the empty areas when said first queue becomes empty.

3. An apparatus according to claim 1, wherein said recording means records said first queue and said second queue on said recording medium.

4. An apparatus according to claim 3, further comprising:
reading means for reading said first queue and said second queue which are recorded on said recording medium,
wherein said recording means records said input data in said empty areas registered in said first queue read by said reading means, according to the sequence determined by said determining means, and
wherein said registering means registers said empty areas from which data has been deleted in said second queue read by said reading means.

5. An apparatus according to claim 1, wherein said sequence comprises either a sequence of addresses of said empty areas or a sequence of sizes of said empty areas.

6. An apparatus according to claim 1, wherein said sequence comprises a sequence of addresses of said empty areas, said registering means registers said empty areas from which data has been deleted in said first queue or said second queue, based on a positional relationship between said empty areas from which data has been deleted and areas in which said input data is recorded by said recording means immediately before the data is deleted.

7. An apparatus according to claim 1, wherein said recording means records positional information representing the positions of areas in which said input data is recorded, on said recording medium.

8. An apparatus according to claim 7, further comprising:
reading means for reading said positional information recorded on said recording medium, and
wherein said registering means registers said empty areas present on said recording medium in said first queue or said second queue based on a relationship between the positions of said empty areas and the positions represented by the positional information read by said reading means.

9. A recording method, comprising the steps of:
determining a sequence to record input data in empty areas among recording areas of a recording medium for uniformerly recording counts in respective recording areas;
recording said input data in said empty areas according to the sequence determined by said determining step;
registering said empty areas present on said recording medium in a first queue before said input data is recorded in said empty areas by said recording step, and, when said input data is recorded in said empty areas registered in said first queue, deleting the empty areas in which said input data has been recorded from said first queue, and registering empty areas from which data has been deleted in a second queue; and
moving said empty areas registered in said second queue to said first queue when said first queue becomes empty,
wherein said input data is recorded in said empty areas registered in said first queue according to the sequence determined by said determining step.

10. A method according to claim 9, wherein said determining step determins a sequence to record input data in said empty areas registered in said first queue for uniformerly recording counts in the respective recording areas, and said moving step moves said empty areas registered in said second queue to said first queue while keeping the sequence of the empty areas when said first queue becomes empty.

11. A method according to claim 9, wherein said recording step records said first queue and said second queue on said recording medium.

12. A method according to claim 11, further comprising:
reading said first queue and said second queue which are recorded on said recording medium,
wherein said recording step records said input data in said empty areas registered in said first queue read by said reading step, according to the sequence determined by said determining step, and
wherein said registering step registers said empty areas from which data has been deleted in said second queue read by said reading step.

13. A method according to claim 9, wherein said sequence comprises either a sequence of addresses of said empty areas or a sequence of sizes of said empty areas.

14. A method according to claim 9, wherein said sequence comprises a sequence of addresses of said empty areas, said registering step registers said empty areas from which data has been deleted in said first queue or said second queue, based on a positional relationship between said empty areas from which data has been deleted and areas in which said input data is recorded by said recording step immediately before the data is deleted.

15. A method according to claim 9, wherein said recording step records positional information representing the positions of areas in which said input data is recorded, on said recording medium.

16. A method according to claim 15, further comprising
reading said positional information recorded on said recording medium,
wherein said registering step registers said empty areas present on said recording medium in said first queue or said second queue based on a relationship between the positions of said empty areas and the positions represented by the positional information read by said reading step.

17. A computer-readable recording medium, storing a processing program, which when executed causes a processing apparatus to execute a recording process, said recording process comprising:
controlling determination of a sequence to record input data in empty areas among recording areas of a recording medium for uniformerly recording counts in respective recording areas;
controlling recording of said input data in said empty areas according to the sequence determined by said determination controlling step;
controlling registration of said empty areas present on said recording medium in a first queue before said input data is recorded by the recording controlling step;
controlling the deletion said empty areas in which said input data has been recorded from said first queue, and the registration of empty areas from which data has been deleted in a second queue when said input data is recorded in said empty areas registered in said first queue; and
controlling movement of said empty areas registered in said second queue to said first queue when said first queue becomes empty,
wherein said input data is recorded in said empty areas registered in said first queue according to the sequence determined by said determination controlling step.

* * * * *